United States Patent [19]

Miyake

[11] Patent Number: 5,530,898
[45] Date of Patent: Jun. 25, 1996

[54] DIGITAL RECORDER FOR STORING AUDIO DATA ON TRACKS WITH SPECIFIC OPERATION MODES INPUTTED MANUALLY WHERE SOUNDLESS PORTION DATA IS INSERTED BASED ON RESPECTIVE OPERATION MODES

[75] Inventor: Atsushi Miyake, Tokyo, Japan

[73] Assignee: Casio Computer Co., Ltd., Tokyo, Japan

[21] Appl. No.: 850,684

[22] Filed: Mar. 10, 1992

[30] Foreign Application Priority Data

Mar. 13, 1991 [JP] Japan ................... 3-074058
Jun. 4, 1991 [JP] Japan ................... 3-159646

[51] Int. Cl.⁶ ................................. G06F 3/06
[52] U.S. Cl. ................ 395/834; 395/888; 369/24; 360/4; 364/284.2; 364/251.7; 364/254.9; 364/DIG. 1
[58] Field of Search ............ 395/250, 2.2, 888, 395/834, 2.4; 340/146.1; 360/48, 13, 14, 27, 53, 4; 371/38; 369/48, 83, 24; 364/513.5; 381/46, 106, 29–35

[56] References Cited

U.S. PATENT DOCUMENTS

| | | | |
|---|---|---|---|
| 4,211,997 | 7/1980 | Rudnick et al. | 371/38 |
| 4,375,083 | 2/1983 | Maxemchuk | 395/2.87 |
| 4,449,190 | 5/1984 | Flanagan et al. | 364/513.5 |
| 4,501,614 | 2/1985 | Blüthgeh | 381/94 |
| 4,750,213 | 6/1988 | Novak | 455/67 |
| 4,772,959 | 9/1988 | Amaro et al. | 360/8 |
| 4,893,197 | 1/1990 | Howells et al. | 360/8 |
| 4,944,012 | 7/1990 | Morio et al. | 381/30 |
| 4,991,581 | 2/1991 | Andries | 128/715 |
| 5,166,804 | 11/1992 | Takahashi | 358/341 |
| 5,218,640 | 6/1993 | Morio et al. | 381/30 |
| 5,220,611 | 6/1993 | Nakamura et al. | 381/48 |

OTHER PUBLICATIONS

JAS Journal, Apr. 1989, pp. 16–22.
Japane Abstract, 62–197331, Nakano (Purpose & Constitution).

Primary Examiner—Thomas C. Lee
Assistant Examiner—Sang Hui Kim
Attorney, Agent, or Firm—Frishauf, Holtz, Goodman, Langer & Chick

[57] ABSTRACT

A soundless period is detected from audio data stored in a memory medium, and soundless portion data relevant to the detected soundless period is eliminated. Sound portion data following the soundless portion data is stored right after previously stored sound portion data, so that audio data is compressed. When the audio data is reproduced, the soundless portion data is generated during the soundless period, and the original sound is reproduced. Soundless portion data is inserted into an arbitrary portion of the audio data to form a break. This soundless portion data is not stored in the memory medium, but, in a playing mode, the soundless portion data is automatically generated from a designated time for a designated period.

9 Claims, 17 Drawing Sheets

| EVENT No. | ORIGINAL TRACK | START POINT | END POINT | ATTRIBUTE |
|---|---|---|---|---|
| 1 | 1 | 0000000 | 1119999 | TAKE |

↓ GATE PROCESSING
(GATE ADDRESS TABLE)

| EVENT No. | START POINT | END POINT | BLANKING LENGTH |
|---|---|---|---|
| 1 | 0000000 | 0015000 | 0002000 (SOUND SUB-EVENT 1) |
|   | 0015001 | 0239000 | 0019087 (SOUND SUB-EVENT 2) |
|   | 0239001 | 0607908 | 0178000 (SOUND SUB-EVENT 3) |
|   | 0607909 | 0920912 | 0000000 (SOUND SUB-EVENT 4) |

| EVENT NUMBER | ORIGINAL TRACK | START POINT | END POINT | ATTRIBUTE |
|---|---|---|---|---|
| 1 | 1 | 0000000 | 0920913 | TAKE |

↓ BREAK PROCESSING (BREAK KEY)

| EVENT NUMBER | START POINT | END POINT | BLANKING LENGTH |
|---|---|---|---|
| 1 | 0000000 | 0015000 | 0002000 (SOUND SUB-EVENT 1) |
|   | 0015001 | 0239000 | 0019087 (SOUND SUB-EVENT 2) |
|   | 0239001 | 0607908 | 0178000 (SOUND SUB-EVENT 3) |
|   | 0607909 | 0920912 | 0000000 (SOUND SUB-EVENT 4) |

DIGITAL RECORDER FOR STORING AUDIO DATA ON TRACKS WITH SPECIFIC OPERATION MODES INPUTTED MANUALLY WHERE SOUNDLESS PORTION DATA IS INSERTED BASED ON RESPECTIVE OPERATION MODES

BACKGROUND OF THE INVENTION

1. Field of the Invention

The present invention relates to a digital recorder which is capable of recording, reproducing and/or editing an audio signal using digital techniques.

2. Description of the Related Art

Conventionally, as a method of recording, reproducing and editing an audio signal, a magnetic recording and reproducing technique is employed in which an analog audio signal is recorded on a magnetic tape, and the recorded signal is reproduced and edited. Since this prior art involves a recording and reproducing process for a signal in an analog form, deterioration in sound quality is inevitable. In particular, the deterioration will be prominent when the once-recorded audio signal is dubbed.

Further, use of the magnetic tape as a recording medium raises problems such that it takes much time to reach a target editing point on the magnetic tape, and editing requires that the target recording portion of the magnetic tape be physically cut and pasted or be copied on somewhere else before the editing is executed actually.

The problem of the deterioration in sound quality can be overcome by employing a technical means that codes a signal into a digital form and records on a magnetic tape. However, there still remains a shortcoming concerning location of a starting point for editing and freedom of editing due to the use of a sequential-access type recording medium.

In recent, there has been proposed a solution to the conventional problems which used a hard disk or a magneto-optical disk as a memory medium. For instance, refer to U.S. Ser. No. 07/690,710 filed on Apr. 24, 1991, inventor: Nobuo IIZUKA, U.S. Ser. No. 07/752,876 filed on Aug. 30, 1991, inventor: Atsushi MIYAKE, U.S. Ser. No. 07/795,983 filed on Nov. 22, 1991, inventor: Nobuo IIZUKA and U.S. Ser. No. 07/807,053 filed on Dec. 12, 1991, inventor: Nobuo IIZUKA.

In recording audio data on and reproducing it from an external memory medium such as the hard disk and the magneto-optical disk, even though the audio data should include a continuous soundless portion therein, no specific measure is taken in conventional techniques for such soundless portion, resulting in poor economic efficiency of the memory medium.

Further, such a continuous soundless portion included in the audio data will make it difficult to insert a silent portion (a break) at an arbitrary position in the audio data.

SUMMARY OF THE INVENTION

The present invention has been made to solve these problems, and has an object to provide a digital recorder in which processing for inserting a silent portion or a soundless portion into an audio signal can be effected easily.

More specifically, it is an object of the present invention to provide a digital recorder, in which a soundless portion of audio data recorded on an audio memory medium can be used more effectively, and a soundless portion can be easily inserted into audio data.

According to one aspect of the present invention, there is provided a digital recorder which comprises:

audio input/output means for executing input/output operation of audio data;

audio data memory means for storing audio data transferred from said audio input/output means;

soundless portion data detecting means for detecting soundless portion data among the audio data stored in said audio data memory means; and memory control means for controlling said audio data memory means so as to store sound portion data following the soundless portion data detected by said soundless portion data detecting means right after previously stored sound portion data to eliminate the detected soundless portion data from said audio data memory means.

In the above structure of the digital recorder, soundless portion data detected by the soundless portion data detecting means is eliminated from the audio data memory means, and then sound portion data following the detected soundless portion data is stored right after sound portion data previously recorded. Therefore, a memory area in the audio data memory means will be used economically.

In addition to these means, the digital recorder may be provided with gate address table memory means for storing a gate address table which stores (i) a joint position data representing a joint position where the sound portion data following the soundless portion data is stored by said memory control means right after the previously stored sound portion data and (ii) a length data which represents a time length of the soundless portion data detected between the sound portion data, and soundless sound data generating means for generating soundless portion data so as to generate no sound for a time duration corresponding to the length data when the sound portion data stored at the joint position is reproduced.

In the above structure of the digital recorder, since soundless sound data is generated (i.e., no sound is generated) for a time duration corresponding to the length of the soundless portion data which was present in the audio data before it is eliminated from the audio data memory means when the digital recorder reproduces the audio data at the joint position, the original sound can be reproduced even though the soundless portion data is not actually stored in the audio data memory means.

According to another preferred aspect of the present invention, there is provided a digital recorder which comprises:

audio input/output means for executing input/output operation of an audio signal in association with a plurality of tracks;

buffer means for exchanging audio data track by track with said audio input/output means and storing temporarily the audio data in association with the respective tracks;

external memory means of a random access type, for exchanging the audio data with said buffer means, and having memory area which stores the audio data for a plurality of tracks and is accessible for read/write operation of the audio data;

data transfer means for executing (i) data transfer of the audio data track by track between said audio input/output means and said buffer means and (ii) data transfer of the audio data track by track between said buffer means and said external memory means, in a time sharing manner while scheduling in accordance with a predetermined order of priority;

soundless portion data detecting means for detecting soundless portion data among the audio data stored in said external memory means;

memory control means for controlling said external memory means to store sound portion data following the soundless portion data detected by said soundless portion data detecting means right after previously stored sound portion data so as to eliminate the detected soundless portion data from said external memory means;

table memory means for storing an address table which stores (i) a joint position data representing a joint position where the sound portion data following the detected soundless portion data is stored right after the previously stored sound portion data and (ii) a length data representing a time length of the soundless portion data; and soundless sound data generating means for controlling said data transfer means when sounds are reproduced in accordance with contents stored on said table memory means, and generating soundless portion data so as to generate no sound for a time period corresponding to the length data stored in said address table and writing it into said buffer means when sound portion data stored at the joint position is reproduced.

According to yet another aspect of the present invention, there is provided a digital recorder which comprises:

a memory medium for storing audio data;

temporary storing means for storing temporarily audio data reproduced from said memory medium;

instructing means for issuing a command to insert soundless portion of a desired length into the audio data reproduced from said memory medium;

control means for writing soundless portion data having the desired time duration into said temporary storing means in place of the audio data reproduced from said memory medium in order to generate no sound for the desired length, when said instructing means issues a command to insert the soundless portion into the audio data; and audio output means for sequentially reading out contents stored in said temporary storing means at a predetermined sampling rate and outputting sounds.

In this structure of the digital recorder, soundless portion data which corresponds to a soundless portion of a desired length defined in accordance with the instruction of insertion made by the instructing means is written into the temporary storing means. Further, the instructing means allows to specify the length of the soundless portion to be inserted by any one of a time duration, a tempo value and number of beats, or tapping.

According to still another aspect of the preferred embodiment of the invention, there is provided a digital recorder which comprises:

audio memory means for storing audio data;

instructing means for issuing a command to insert soundless portion into the audio data stored in said audio memory means; and soundless portion data generating means for generating soundless portion data so as to generate no sound for a desired time duration immediately after previously reproduced audio data in place of the audio data to be reproduced from said audio memory means, when said instructing means issues a command to insert the soundless portion into the audio data.

In the above structure of the embodiment, any type of audio memory means may be employed. In this instance, the embodiment may be used as an apparatus which is specified in a reproducing operation and does not execute an input operation of the audio signal.

Further, the present invention may be realized as a digital recorder which comprises:

audio input/output means for executing input/output operation of an audio signal in association with a plurality of tracks;

buffer means capable of exchanging audio data track by track with said audio input/output means and storing temporarily the audio data in association with the respective tracks;

external memory means of a random access type, capable of exchanging the audio data with said buffer means, and having memory area which stores the audio data for a plurality of tracks and is accessible for read/write operation of the audio data;

data transfer means for executing (i) data transfer of the audio data track by track between said audio input/output means and said buffer means and (ii) data transfer of the audio data track by track between said buffer means and said external memory means, in a time sharing manner while scheduling in accordance with a predetermined order of priority;

instructing means for issuing a command to insert soundless portion data at a desired position in the audio data stored in said external memory means;

table memory means for storing an address table which stores (i) an insertion position data representing an insertion position where the soundless portion data is inserted in the audio data, and (ii) a length data representing a time length of silence, when said instructing means issues a command to insert the soundless portion data into the audio data;

soundless sound data generating means for controlling said data transfer means, when sounds are reproduced in accordance with contents stored in said table memory means, and generating soundless portion data so as to generate no sound for a period equivalent to the time length designated by said length data stored in said address table and writing the generated soundless portion data into said buffer means, when a soundless portion is inserted at the insertion position.

It would be apparent for those skilled in the art from the following description of preferred embodiments that the present invention may be therefore modified or changed in various different manners as well as applied to other cases.

BRIEF DESCRIPTION OF THE DRAWINGS

Other objects and structures of the present invention will be more fully understood by those skilled in the art from the following description of the preferred embodiments and the accompanying drawings.

DETAILED DESCRIPTION OF THE PREFERRED EMBODIMENTS

Preferred embodiments of the present invention will be described referring to the accompanying drawings.
<General Structure>

Figure 1:
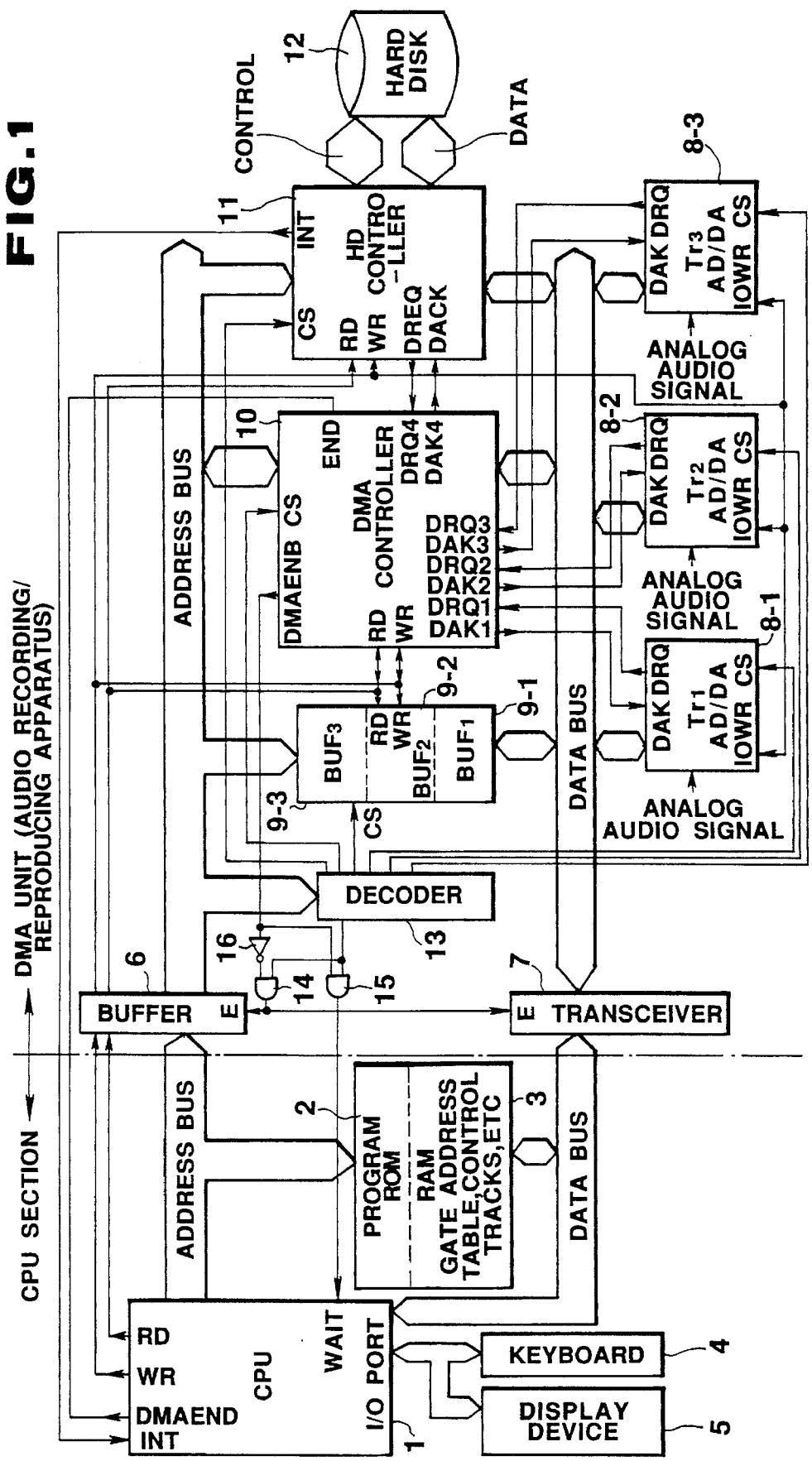
FIG. 1 is a diagram illustrating the general structure of an embodiment of a digital recorder according to the present invention.

FIG. 1 illustrates the general structure of the first embodiment of the digital recorder, which is designed to be able to execute simultaneously a recording/reproducing operation with respect to up to three tracks. The structure is divided into a CPU section and a DMA unit (audio recording/reproducing unit), as shown in FIG. 1.

The CPU section comprises a CPU 1, a program ROM 2, a RAM 3, a keyboard 4 and a display device 5. The program ROM 2 stores a program (to be described in detail later) for specifying the operation of the CPU 1. The RAM 3 includes memory areas for storing various data, three-track disk access pointer, an event address table (refer to FIG. 13), individual control tracks, a gate address table, respectively and a work area. Audio data stored on a hard disk 12 is automatically or manually divided into a plurality of sectioned audio data, which are referred to as events, and event identifying index data (event Nos.) and memory location data (an original track number, a start point and end point) are assigned to the respective events. The event address table includes these event identifying index data and memory location data. Further, the individual control track includes the event identifying index data for each track included in the event address table, which index data are disposed in order of reproduction of the events. The gate address table stores a joint position data representing a joint position where sound portion data following soundless portion data is stored on the hard disk 12 right after sound portion data previously stored so as to eliminate soundless portion data on the hard disk 12 and also stores a length (a blank length) of data representing a length of the soundless portion which was present between the above two sound portion data (a plurality of sound portion data separated by soundless portion data in one event are referred to as sound sub-events respectively). The keyboard 4 is connected as a peripheral device to an I/O port of the CPU 1 and has various function keys and data input keys. The display device 5 has a cathode ray tube (CRT) or a liquid crystal display (LCD) and its driver for providing various displays.

As will be described later, in the real time operation such as in the recording/reproducing operation, the CPU 1 controls individual components in the DMA unit as needed while an address bus and a data bus in the DMA unit are not busy. In editing an audio signal, the CPU 1 rearranges data blocks and manipulates the disk access pointer. Setting a record/play mode for each track (hereafter referred to as Tr), starting and stopping the mode, locating the track and designating an editing point can be effected using the keyboard 4, as will be described later. An address signal is sent from the CPU 1 through the address bus to address terminals of the program ROM 2 and RAM 3, which have their output terminals connected through the data bus to CPU 1 or a transceiver 7.

A buffer 6 and the transceiver 7 are provided in the DMA unit to connect the CPU section to the DMA unit. The buffer 6, through the address bus, connects the CPU 1 to the DMA unit, and is connected to an address bus in the DMA unit. The transceiver 7 is connected through the data bus to the CPU 1, and is also connected to a data bus in the DMA unit.

In the DMA unit are provided an audio input/output device 8-1 for Tr1, an audio input/output device 8-2 for Tr 2 and an audio input/output device 8-3 for Tr3, which will independently receive or output an analog audio signal.

The audio input/output devices 8-1 to 8-3 each include a converter for selectively executing A/D conversion and D/A conversion, a low pass filter for eliminating sampling noises and a clock circuit for generating a clock signal of a sampling signal. When the mentioned tracks for the respective audio input/output devices 8-1 to 8-3 are set in a recording mode, each audio input/output device samples an externally supplied analog audio signal at the sampling cycle, and executes A/D conversion on the sampled signal to obtain digital audio data. When these tracks are set in a playing mode, the digital audio data which has been read out in advance is subjected to D/A conversion at the sampling cycle, and is then properly filtered to be output as an analog audio signal.

The audio input/output devices 8-1 to 8-3 for the respective Tr1 to Tr3 are connected through the data bus to buffers 9-1 (BUF 1), 9-2 (BUF 2) and 9-3 (BUF 3), respectively, exchanging digital audio data therewith.

The buffers 9-1 to 9-3 correspond to Tr1 to Tr3, respectively, and exchange data respectively with the audio input/output devices 8-1 to 8-3 through direct memory access under control of a DMA controller 10.

In the recording mode, the audio input/output devices 8-1 to 8-3 request the DMA controller 10 for DMA transfer (single transfer) of digital data in association with one sampling from the audio input/output devices 8-1 to 8-3 to the buffers 9-1 to 9-3 at the sampling cycle. That is, the audio input/output devices 8-1 to 8-3 send DRQ signals (signal DRQ 1 for Tr1, DRQ 2 for Tr 2 and DRQ 3 for Tr3) to the DMA controller 10, and then the DMA controller sends back acknowledgement signals (signal DAK 1 for Tr1, DAK 2 for Tr 2 and DAK 3 for Tr3) to the devices 8-1, 8-2 and 8-3, executing actually the data transfer.

In the playing mode, the audio input/output devices 8-1 to 8-3 request the DMA transfer (single transfer) of the digital data in association with one sampling at the sampling cycle from the buffers 9-1 to 9-3 to the audio input/output devices 8-1 to 8-3, and the DMA controller 10 executes the data transfer as described above.

The buffers 9-1 to 9-3 each have memory capacity sufficient for storing digital audio data for multiple times. That is, the buffers 9-1 to 9-3 comprise memory areas in RAM which are prepared for Tr1 to Tr3 respectively, and these buffers are arranged to function as FIFO buffers, when they are used as ring buffers (a buffer whose last address and first address are imaginarily linked together).

The buffers 9-1 to 9-3 are addressed through the address bus by the DMA controller 10. The address bus, the data bus and a control signal line within the DMA unit are occupied by the DMA controller 10, while the DMA transfer is being executed.

The buffers 9-1 to 9-3 exchange data through the data bus with the hard disk 12 under control of a hard disk controller 11 (hereafter referred to as HD controller). The hard disk 12 and the HD controller 11 are connected to each other through the data bus and the control signal line. The hard disk 12 is accessed for read/write operation under control of the HD controller 11. The hard disk 12 has three separate memory areas which are prepared for three tracks Tr1 to Tr3 respectively. Data transfer between the hard disk 12 and the buffers 9-1 to 9-3 is executed under control of the DMA controller 10. The HD controller 11 serves to execute the data transfer by sending an interrupt signal (INT) to the CPU 1 after the HD controller 11 has transferred one data block, and sending a command to transfer the following data. Upon receiving the interrupt signal INT from the HD controller 11, the CPU 1 sets the DMA controller 10, the HD controller 11 to a desired mode or effect programming thereof, and then allows the controllers to execute the DMA transfer (block transfer). This operation will be described in detail later.

In the playing mode, reading out previously determined amount (data for multiple sampling cycle) of digital audio data from the hard disk 12, the DMA controller 10 executes the DMA transfer (block transfer) of the digital audio data to the designated buffer among the buffers 9-1 to 9-3. In the recording mode, the DMA controller 10 reads out the predetermined amount (data for multiple sampling cycles) of digital audio data from the designated buffer among the buffers 9-1 to 9-3, and executes the DMA transfer (block transfer) of the data to a designated location on the hard disk 12.

For exchanging data between the hard disk 12 and the buffers 9-1 to 9-3, the HD controller 11 sends a request signal DREQ to the DMA controller 10 (the DMA controller 11 receives the request signal as DRQ 4), and the DMA controller 10 sends back a response signal DACK to the HD controller 11 when the data transfer is made ready.

As described above, the DMA controller 10 executes the data transfer on four channels in the time sharing manner: the data transfer on three channels (CH1 to CH3, to be described later) between the audio input/output devices 8-1 to 8-3 for Tr1 to Tr3 and the buffers 9-1 to 9-3 and the data transfer on one channel (CH4, to be described later) between the hard disk 12 and any one of the buffer which is selected sequentially from the buffers 9-1 to 9-3.

The CPU 1 supplies an address signal through the address bus to the buffer 6 to control functions or operation of individual components within the DMA unit, and also supplies designating signals for designating the components through the buffer 6 to the decoder 13, then sending the designating signals CS to the audio input/output devices 8-1 to 8-3, the buffers 9-1 to 9-3, the DMA controller 10 and the HD controller 11. At the same time, the CPU 1 exchanges data with these circuits via the data bus through the transceiver 7.

Further, the CPU 1 supplies IOWR terminals of the respective audio input/output devices 8-1 to 8-3 through the buffer 6 with the designating signal WR which designates if the audio input/output devices 8-1 to 8-3 should be set to the recording mode (write mode) or the playing mode (read mode).

The CPU 1 also sends the designating signal (write signal) WR and another designating signal (read signal) RD through the buffer 6 to the buffers 9-1 to 9-3, the DMA controller 10 and the HD controller 11, for reading out data from and writing data in the respective components. The DMA controller 10 also outputs the designating signals RD and WD in a DMA transfer mode. The relationship among these signals and the functions and operation of these components will be described in detail later.

The DMA controller 10 sets a DMA enabling signal DMAENB to "1" and outputs it while the DMA transfer is being executed between the components within the DMA unit. When the signal DMAENB is sent to an AND gate 14 through an invertor 16, the output of the AND gate 14 becomes "0". Then the enabling signal E is supplied as "0" to the buffer 6 and the transceiver to disable the CPU section and the DMA unit to exchange data and address transfer with each other. If a signal of "1" is supplied to an AND gate 15 from the decoder 13 in this case, the output of the AND gate 15 becomes "1", allowing a wait signal WAIT to be supplied to the CPU 1.

If the DMA transfer starts while the CPU 1 supplies the decoder 13 with a predetermined signal to enable the buffer 6 and the transceiver 7 in order to control the DMA unit, that is, while the decoder 13 supplies a signal of "1" to an input terminal of the AND gate 14 (when the CPU 1 outputs the address signal to access any one of the buffers 9-1 to 9-3, the DMA controller 10, the HD controller 11 and the audio input/output devices 8-1 to 8-3, the output of the decoder 13 becomes active, sending the signal of "1" to an input terminal of each of the AND gates 14 and 15), the CPU 1 receives a wait signal WAIT, allowing the DMA transfer to be executed by priority over other operations. After the DMA transfer is completed, the CPU 1 is released from WAIT, starting the operation again.

Even if the CPU 1 tries to access the DMA controller 10 while the DMA controller 10 is executing the DMA transfer, the wait signal WAIT is supplied from the AND gate 15 to the CPU 1, and the execution cycle of the CPU 1 is made longer to disable the buffer 6 and the transceiver 7 during this period.

In short, the CPU 1 is allowed to access the components within the DMA unit under the following conditions:

(1) when the CPU 1 outputs an address to access the individual components within the DMA unit, and (2) when the signal DMAENB is inactive ("0"), that is, the data bus within the DMA unit is not busy.

The CPU 1, however, is allowed to proceed with processing by action of the AND gates 14 and 15 without considering when to access the DMA unit.

To immediately change the operating state of the DMA unit in response to a trigger of the control data or a key input, the CPU 1 is allowed to output the command DMAEND to the DMA controller 10 to interrupt the DMA transfer whatever state the DMA controller 10 is in (the command is supplied as an END signal to the DMA controller 10).

<Structure of Essential portions of the DMA controller 10>

One example of the structure of the DMA controller 10 will now be described. The DMA controller 10 can transfer in one bus cycle of several hundred nanoseconds. Therefore, it will take one to two microseconds to transfer the sampling data for three tracks.

When a sampling frequency fs is set to 48 KHz, the interval of one sampling period will be approximately 21 microseconds. It is possible to assign most of the sampling time interval to the time for transferring data among the buffers 9-1 to 9-3, the HD controller 11 and the hard disk 12, and the time for CPU 1 to program the individual components.

Figure 2:
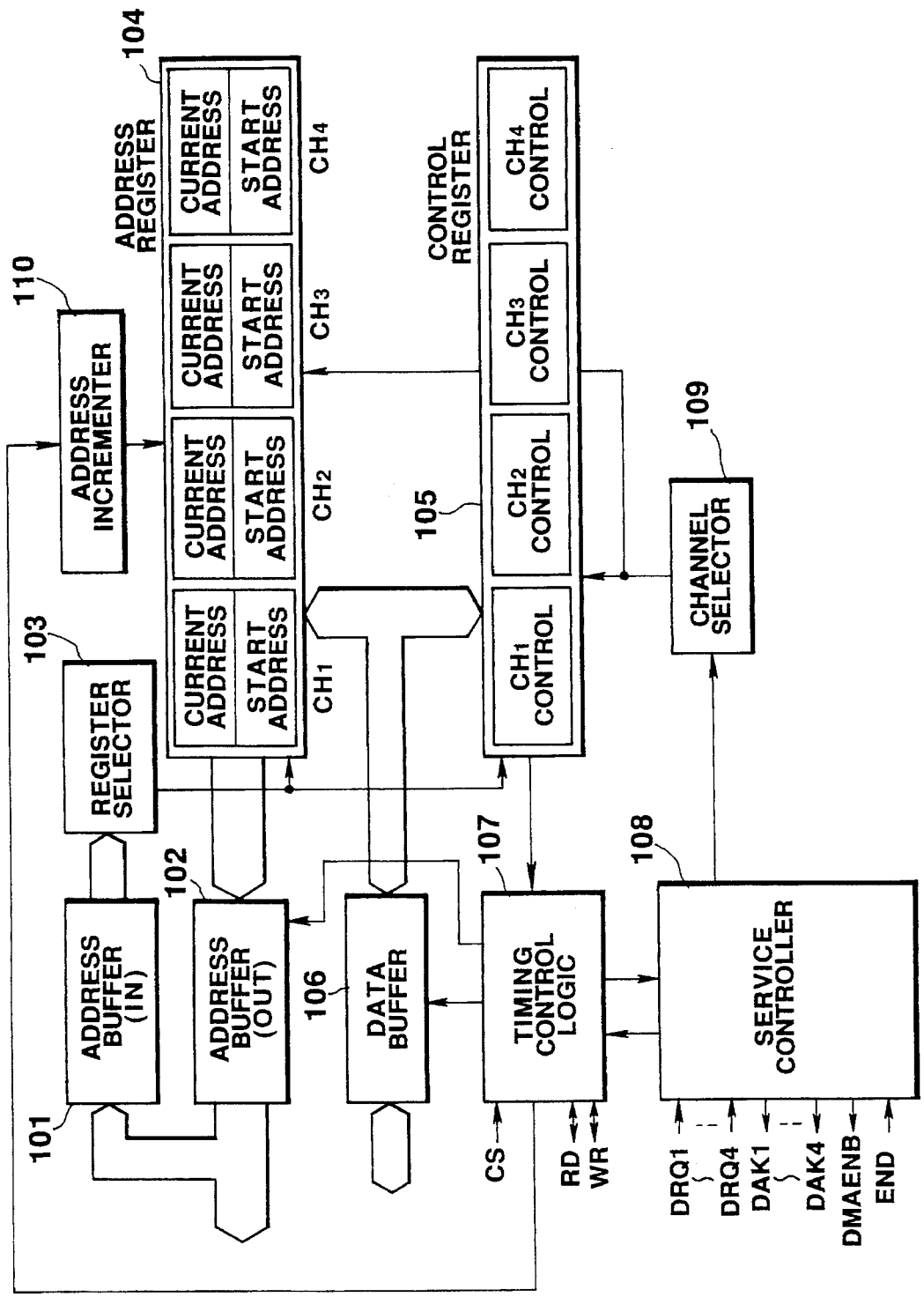
FIG. 2 is a diagram illustrating essential portions of a DMA controller of FIG. 1.

The structure of the essential portions of the embodiment is shown in FIG. 2. The DMA controller 10 has an address buffer 101 on its input side (IN) to be connected to the address bus and an address buffer 102 at its output side (OUT). In accordance with the address signal supplied to the address buffer 101 on the input side, what is designated by a register selector 103 is changed to designate desired registers present in an address register 104 and a control register 105.

The address register 104 and the control register 105 each have areas for four channels CH1 to CH 4. The channels CH1 to CH3 are registers for executing the DMA transfer between the buffers 9-1 to 9-3 and the audio input/output devices 8-1 to 8-3, and the channel CH4 is a register for executing the DMA transfer between the hard disk 12 and the designated buffer among the buffers 9-1 to 9-3.

The registers for the channels CH1 to CH4 in the address register 104 each have a memory area for storing at least current addresses and start addresses of the corresponding buffer 9-1, 9-2 or 9-3 and a designated buffer. The individual areas for channels CH1 to CH4 in the control register 105 store control data for designating the direction of DMA transfer.

The contents of the address register 104 and the control register 105 are allowed to be input from and output to the data bus through a data buffer 106. A timing control logic 107, a service controller 108 and a channel selector 109 control these components.

The service controller 108 is of a hard logic type or of a micro program control type. The service controller 108 receives a signal from the timing control logic 107, the DMA request signals DRQ1 to DRQ4 from the audio input/output devices 8-1 to 8-3 and the HD controller 11 and a DMA interrupt command (DMAEND) from the CPU 1, and outputs response (acknowledge) signals DAK 1 to DAK 4 to the above components and a DMA enabling signal DMAENB indicating that DMA transfer is on. Further, the controller 108 outputs various commands to the timing control logic 107, and a channel selecting signal to the channel selector 109. The channel selector 109 selectively designates registers corresponding to the individual channels CH1 to CH4 in the control register 105.

The timing control logic 107 receives a designating signal CS from the decoder 13, a control signal from the control register 105 and a control signal from the service controller 108, controlling input/output operation of the address buffer 102 and the data buffer 106. Further, the timing control logic 107 enables an address incrementer 110 to increment the current address register of the designated channel in the address register 104.

<Whole Operation of CPU 1>

Figure 3:
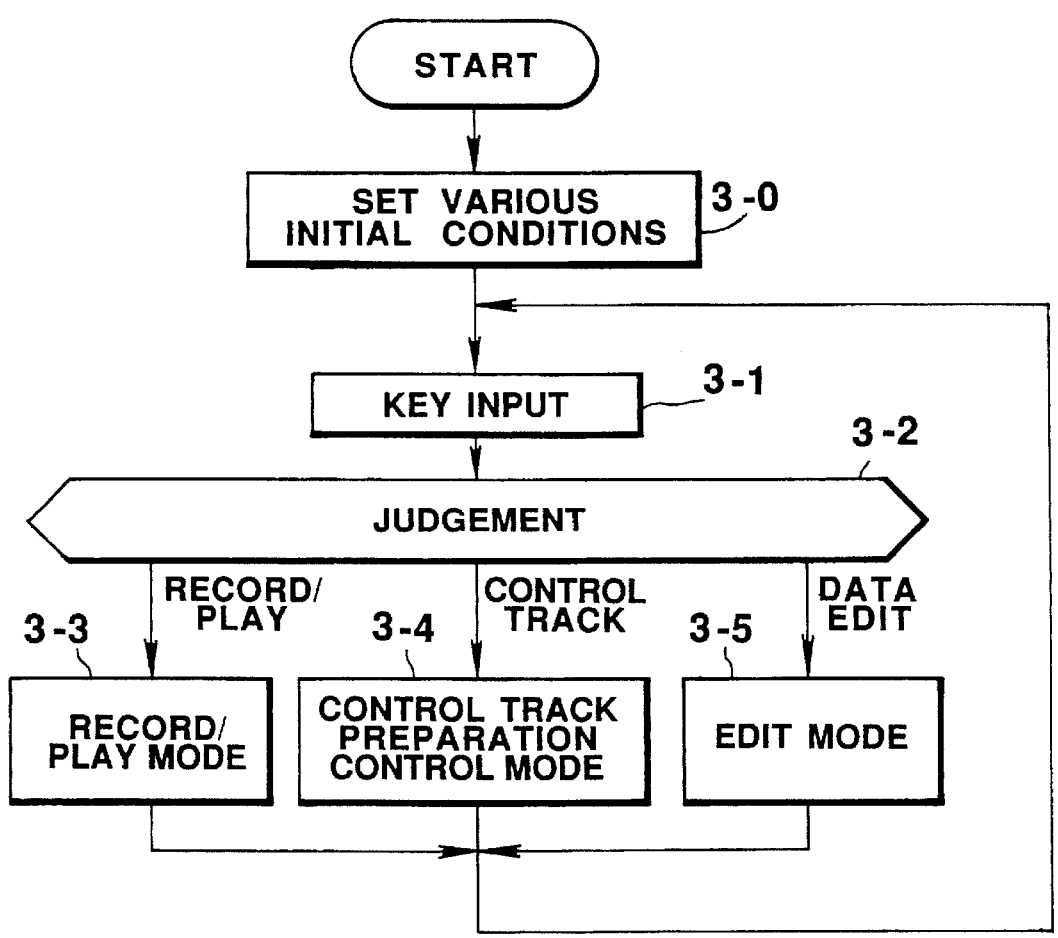
FIG. 3 is a flowchart of the main routine operation of the CPU 1.
Figure 4:
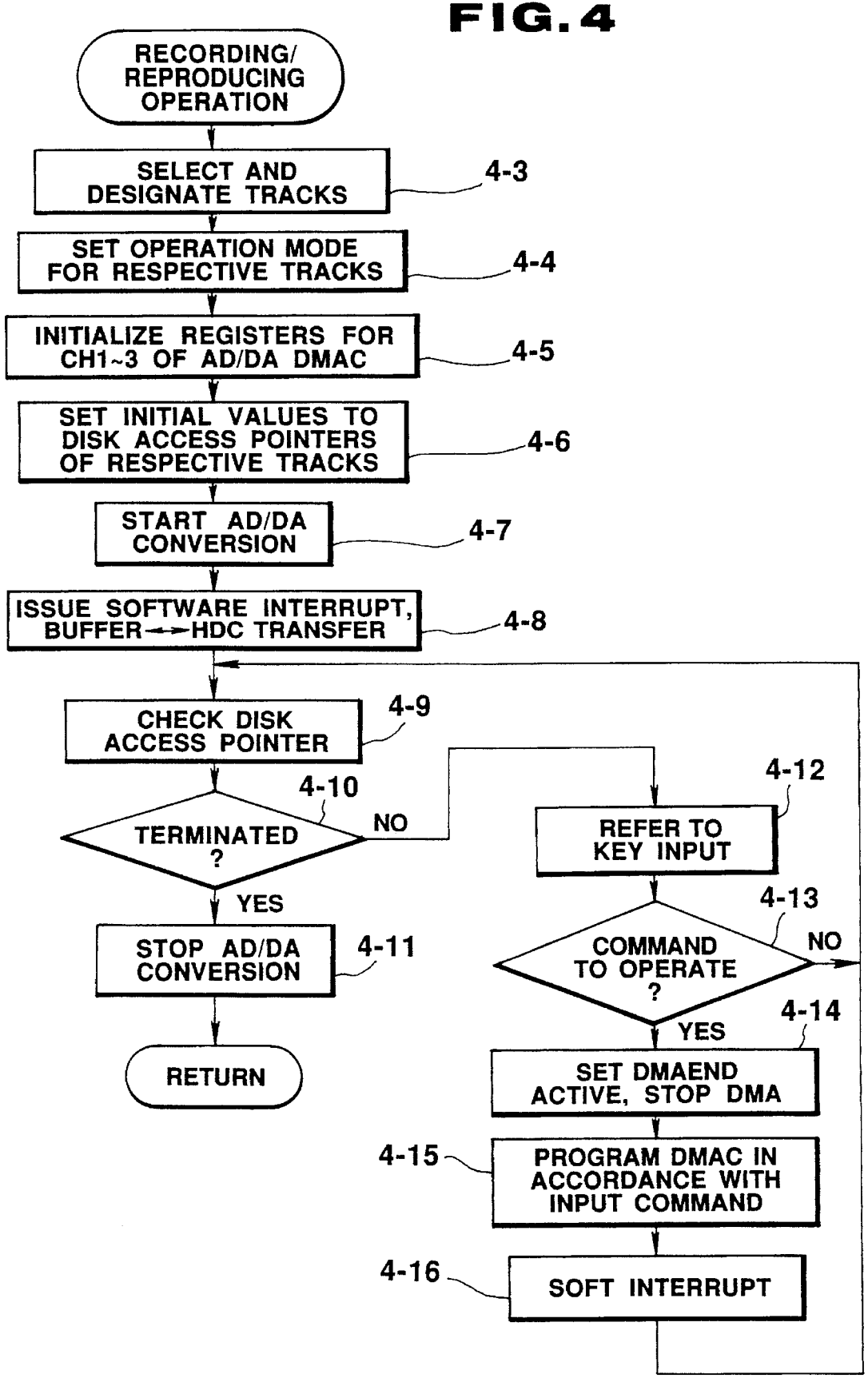
FIG. 4 is a flowchart illustrating the recording/reproducing operation of the CPU 1 of FIG. 3 in detail.
Figure 5:
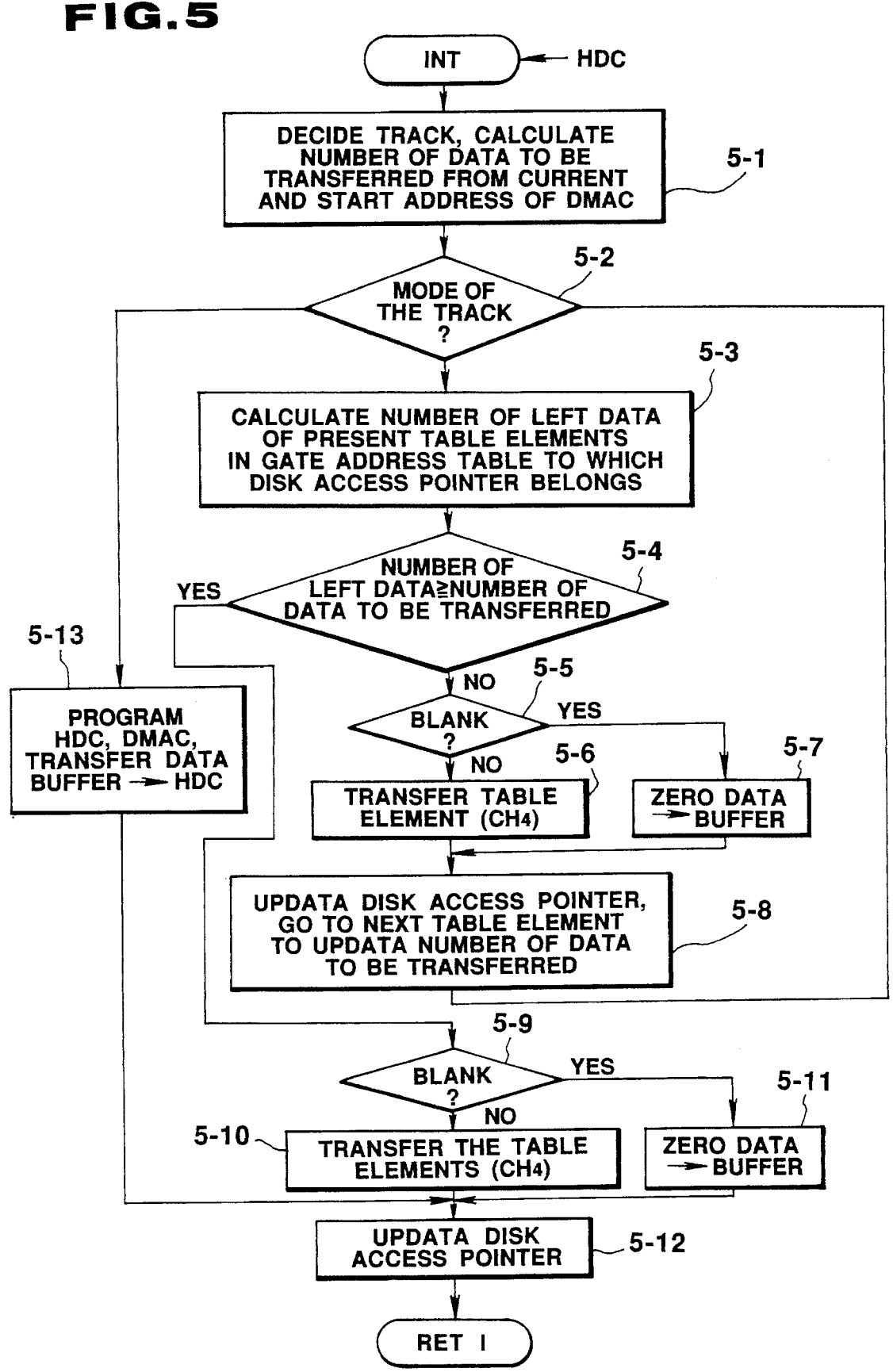
FIG. 5 is an interrupt routine operation of the CPU of FIG. 1.

Now, the operation of the embodiment will be described hereafter. Flowcharts showing the operation of the CPU 1 are shown in FIGS. 3, 4 and 5. The CPU 1 works in accordance with a program (software) stored in the program ROM 2. FIG. 3 is a flowchart of the main routine operation of the CPU 1, FIG. 4 is a flowchart of a recording/reproducing routine operation and FIG. 5 is a flowchart of an interrupt routine operation executed by the CPU 1 when it receives the interrupt signal INT from the HD controller 11.

In FIG. 3, the CPU 1 starts the main routine operation in response to a power on operation. The CPU 1 sets various initial conditions at step 3-0. Receiving a key input at step 3-1, the CPU 1 judges at step 3-2 what mode has been set.

Figure 10:
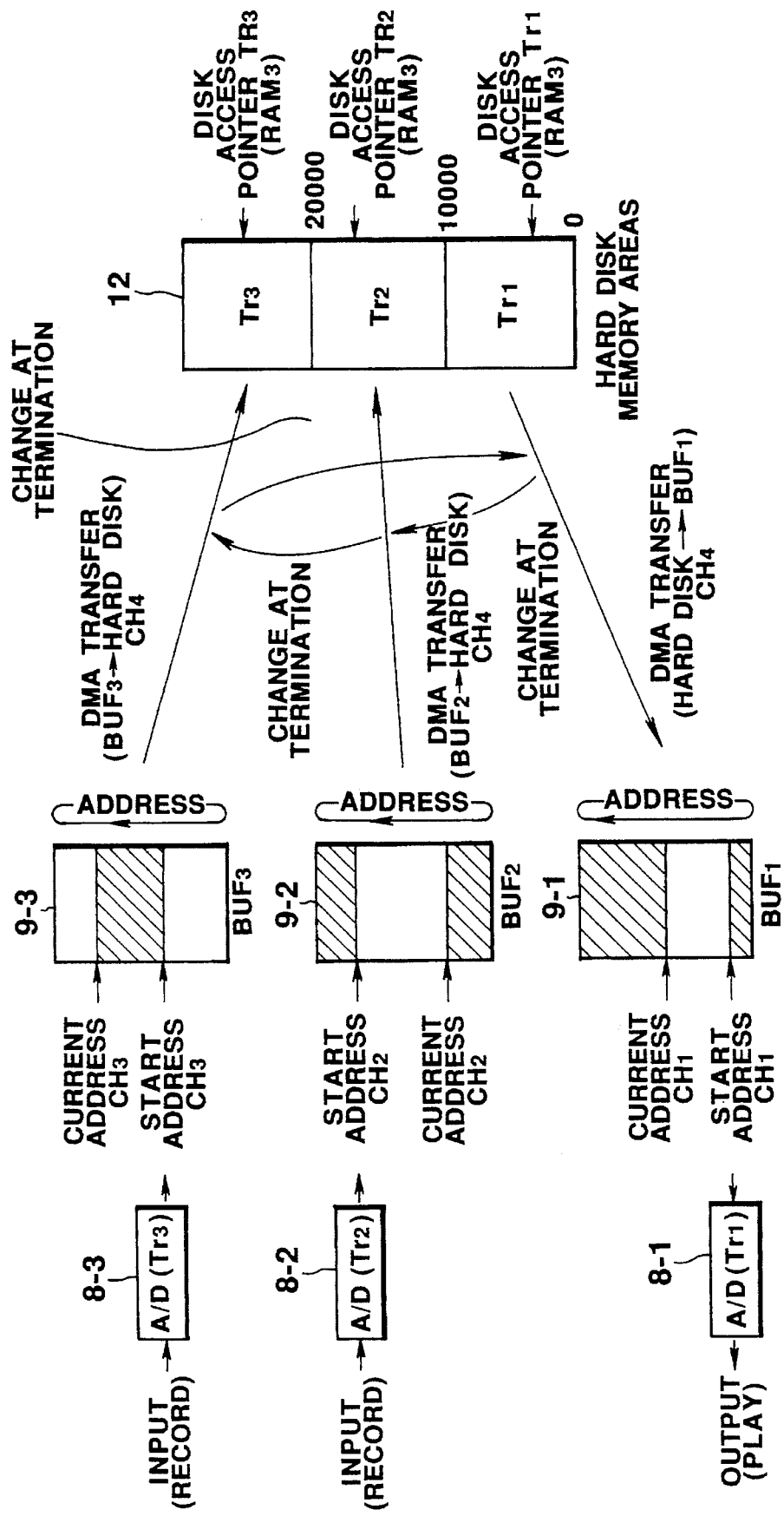
FIG. 10 is a flowchart illustrating general operation of a digital recorder of FIG. 1.

When the CPU 1 judges the recording/playing mode is set at present, the CPU 1 goes from step 3-2 of FIG. 3 to step 4-3 of FIG. 4, where it sequentially selects and designates three tracks, and further advances to step 4-4, where it sets the operation modes for respective tracks in accordance with input instructions from a key board 4. Then the CPU 1 sequentially outputs at step 4-5 the designating signals CS through the buffer 6 and the decoder 13 to the audio input/output devices 8-1 to 8-3, supplying them with IOWR, and decides which operation of A/D conversion and D/A conversion the individual devices should execute. Now, we assume that the playing mode (where D/A conversion is to be executed) is set for the track Tr1, and the recording mode (where A/D conversion is to be executed) is set for the tracks Tr2 and Tr3. FIG. 10 is a view showing the concept of the whole operation of the recorder in which the operation mode has been set as described above.

The CPU 1 controls at step 4-5 the DMA controller 10 to initialize addresses of the buffers 9-1 to 9-3 of the tracks Tr1 to Tr3. More specifically, registers (address registers 104 and the control registers 105) for the respective channels CH1 to CH3 are designated by operation of the address buffer 101, the register selector 103 and the channel selector 109 of FIG. 2, and are supplied with initializing data through the data buffer 106 to be initialized.

The buffers 9-1 to 9-3 are arranged to be used circularly as ring buffers. At the initial condition, the start addresses and the current addresses of the buffers 9-1 to 9-3 are set to coincide to each other (the state is schematically shown in FIG. 10 in which the start addresses and the current addresses of the buffers 9-1 to 9-3 are stored in the address register 104 for CH1 to CH3 to be controlled.

Further, the CPU 1 executes processing of step 4-6, setting to initial values the disk access pointers corresponding to the respective tracks Tr1 to Tr3 present in a work areas in the RAM 3 (relationship between the memory areas in the hard disk 12 and the disk access pointers is shown in FIG. 10).

The CPU 1 causes at step 4-7 the audio input/output devices 8-1 to 8-3 to execute A/D conversion or D/A conversion on received data. At step 4-8, the CPU 1 issues a software interrupt, allowing the processing to be executed which is similar to the processing that is executed when the HD controller 11 sends a program request for data transfer between the hard disk 12 and one of the buffers 9-1 to 9-3 (that is, when the HD controller 11 sends the interrupt signal INT to the CPU 1), as will be described later.

More specifically, the CPU 1 performs at step 4-8 operation in accordance with the flowchart shown in FIG. 5. For example, the CPU 1 selects at step 5-1 the channel CH1 corresponding to the track Tr1 as the channel in DMA controller 10 to execute DMA transfer of the digital audio data, for example, of the sound sub-event 1 in the gate address table or in the event address table EAT of FIG. 13 from the hard disk 12 to the buffer 9-1. Reading out at step 5-1 a current address and a start address form the area of CH1 in the address register 104 of the DMA controller 10, the CPU 1 calculates a number of data to be transferred to the buffer 9-1 or from the buffer 9-1 (that is, in the recording mode, the number of data to be stored in the buffer 9-1 to the full extent or number of data to be transferred from the buffer 9-1, and in the playing mode, the number of data to be stored in an empty area in the buffer 9-1 or number of data to be transferred to the buffer 9-1).

Then, the CPU 1 judges at step 5-2 whether the recording mode or the playing mode is set for the track (track Tr1). When the recording mode is set for the track, the CPU 1 programs the DMA controller 10 and the HD controller 11 and allows data transfer from the buffer 9-1 to the HD controller 10 to be executed at step 5-13. More specifically, the CPU 1 programs the DMA controller 10, by copying the start address of CH1 to the start address and the current address of CH4. The current address of CH4 is increased every time when a unit of data is transferred from the buffer 9-1 to the HD controller 11. Reading out the disk access pointer of the track Tr1 from the work area of the RAM 3, the CPU 1 programs the HD controller 11 from the read out pointer, number of data calculated at step 5-1 to be transferred from the buffer 9-1 to the HD controller 11, and the mode (the recording mode) detected at step 5-2.

As a result, the HD controller 11 makes a request (outputs DREQ) to the DMA controller 10 to execute the DMA transfer from the buffer 9-1 to the hard disk 12. The DMA controller 10 will execute the DMA transfer as requested. At step 5-12, the CPU 1 updates the disk access pointer of the Tr1 in the work area of the RAM 3 to a value which the pointer will take after execution of the above transfer. The DMA controller 10, from now on, executes all the data transfer between the buffer 9-1 and the hard disk 12. When the DMA transfer is completed, the CPU 1 sets the address of the hard disk to the disk access pointer of the Tr1.

Figure 13:
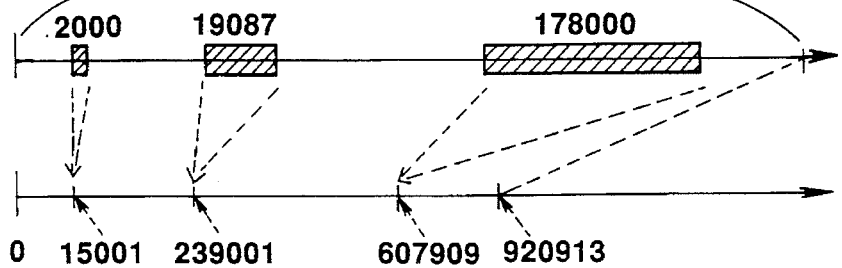
FIG. 13 is a view for explaining an interrelation among an event address table, the gate address table and the gate processing.

When the CPU 1 judges that the playing mode is set for the Tr1, it calculates at step 5-3 the number of data left for present table elements in the gate address table (or in the event address table EAT) to which the disk access pointer in the RAM 3 belongs. The gate address tables are prepared for the respective tracks, and are stored in the RAM 3, as described above. As shown in FIG. 13, the gate address table includes areas on the hard disk 12 to be reproduced, i.e., the start address and the end address representing the start points and end points respectively of the sound sub-events which are disposed in order of reproduction on the hard disk 12 to be reproduced, and a blank length representing a length of soundless portion data appearing between sound portion data in the original audio data. That is the gate address table comprises table elements, each of which includes one start address and end address of one sound sub-event to be reproduced.

The disk access pointer in the RAM 3 is not for indicating the memory address of the audio data which is being reproduced by the audio input/output device 8-1, 8-2 or 8-3 (8-1, in this instance), but for indicating the leading address of a data block stored on the hard disk 12 to be transferred. If the disk access pointer of the Tr1 takes a value of 5001, the table element to which the disk access pointer belongs corresponds to the sound sub-event 1. In this case, the number of data left in the sound sub-event 1 will be calculated as follows:

15000−(5001−1)=10000

At step 5-4, the number of the data left in the sound sub-event 1, as calculated above is compared with the number of data which is calculated at step 5-1 to be transferred. If the latter is larger than the former ("No" at step 5-4) and no soundless portion data is retained from the first at the address designated by the disk access pointer ("No" at step 5-5), data designated by the table element is transferred to the buffer 9-1 at step 5-6. The CPU 1 judges whether or not soundless portion data has been retained at the address designated by the disk access pointer, by referring to the gate address table in the RAM 3 to check if the disk access pointer coincides with the end point of the respective sound sub-event. Assuming that a value of the disk access pointer is 5001, a number of the left data is 10000 and a number of data which can be transferred is 20000 as described above, since 10000<20000 and the value of the disk access pointer does not coincide with the end point of the sound sub-event 1, audio data stored on the hard disk 12 at its addresses from 5001 to 15000 designated by the disk access pointer are transferred to the buffer 9-1. If it is judged at step 5-5 that soundless portion data are retained at the addresses designated by the disk access pointer, zero data stored at a predetermined area in the hard disk 12 are repeatedly read out and transferred to the buffer 9-1.

The CPU 1 programs the DMA controller 10 and the HD controller 11, allowing the data transfer to be executed from the hard disk 12 to the buffer 9-1. The CPU 1 programs the DMA controller 10, by copying the start address of CH1 to the start address and the current address of CH4. The current address of CH4 is increased every time when a unit of data is transferred from the HD controller 11 to the buffer 9-1. The CPU 1 programs the HD controller 11 from the value of the disk access pointer (5001 in this instance), number of data left of the present table element (10000 in this instance), as calculated at step 5-3, and the mode (the playing mode) detected at step 5-2.

As a result, the HD controller 11 makes a request (outputs DREQ) to the DMA controller 10 to execute the DMA transfer from the hard disk 12 to the buffer 9-1. The DMA controller 10 will execute the DMA transfer as requested. At step 5-8, the CPU 1 updates the disk access pointer of the Tr1 in the work area of the RAM 3 to a value which the pointer will take after execution of the above transfer. In the above instance (in FIG. 13), the disk access pointer is updated to 15000, and the operation goes to the following table element (the table element of the sound sub-event 2 in FIG. 13). The number of data which are allowed to be transferred to the buffer 9-1 is also updated (to 10000 in this instance).

The operation returns to step 5-3, again, where the CPU 1 calculates the number of data left in the present table element (i.e., the sound event 1) of the gate address table, to which the disk access pointer belongs (in this instance, the number of data remaining in the sound event 1 is "0"). Then, at step 5-4, the number of the remaining data (0) is compared with the number of data (10000) which are allowed to be transferred. In this instance, since the latter is larger than the former, the operation goes from step 5-4 to step 5-5, where it is checked if soundless portion data are retained at the addresses designated by the disk access pointer. In this case, since the value (15000) of the access pointer coincides with the end point (15000) of the sound sub-event 1, it is judged that soundless portion data have been retained. At step 5-7, the CPU 1 allows the zero data of 2000 units corresponding to the blank length of the sound sub-event 1 in the gate address table to be generated. To generate the zero data, the CPU 1 repeatedly reads out them from a relevant zero-data memory area in the hard disk 12. At step 5-8, the CPU 1 updates the disk access pointer to the start point 15001 of the sound sub-event 2 which is the next table element in the gate address table, but in this case, the number of data which can be transferred will be a value of 8000, which is obtained by subtracting the number of transferred zero data from the previous value of 10000 (i.e., 10000−2000=8000).

Then, the operation returns to step 5-3, again, where the CPU 1 calculates the number of data left in the present table element (i.e., the sound event 2) in the gate address table, to which the disk access pointer belongs (in this instance, the number of data remaining in the sound event 1 is 224000, because the data remain at the addresses from 15001 to 239000). Then, at step 5-4, the number 224000 of data remaining in the present table element (the sound event 2) is compared with the number 8000 of the data which can be transferred to the buffer 9-1.

In this case, since the number of the remaining data is larger than the number of the transferable data, the operation advances from step 5-4 to 5-9, where it is checked if the disk access pointer coincides with the end point of the sound sub-event. Since the disk access pointer does not coincide with the end point of the sound sub-event, the CPU 1 judges at step 5-9 that no soundless portion data have been retained at the addresses designated by the desk access pointer, and advances to step 5-10, where data stored at addresses from 15001 to 23000 in the hard disk 12 are transferred to the buffer 9-1. At step 5-12, the disk access pointer is updated to a value 23000. Then, the operation returns to the main routine of FIG. 4.

As will be apparent from the later description, when the first interrupt routine of FIG. 5 is executed, and the HD controller 11 is activated once, the HD controller 11 issues the interrupt (to send the INT signal to the CPU 1) every time when transfer of the data block designated by the CPU 1 is completed, so that the CPU 1 judges only if the recording/playing operation is terminated, if the key input is made, or if the trigger indicated in the control data is initiated.

More specifically, the CPU 1 refers to the disk access pointer (RAM 3) at step 4-9, and judges at step 4-10 whether or not the memory area is over or the recording/playing operation is terminated. When the result of the judgement at step 4-10 is "Yes" (i.e., when the memory area is over), the CPU 1 stops A/D conversion and D/A conversion in the audio input/output devices 8-1 to 8-3 at step 4-11, and returns to step 3-1 of FIG. 3. When the result of the above judgement is "No" (i.e., when the memory area is not over), the CPU 1 refers to the key input state at step 4-12. If no change has been found, the CPU 1 returns to step 4-9 to refer to the disk access pointer, and then repeatedly executes the processes at steps 4-9 to 4-13.

When there is some change found at step 4-13, the CPU 1 goes from step 4-13 to step 4-14, where the CPU 1 temporarily stops the DMA transfer and outputs the DMA end command (DMAEND) to the DMA controller 19 for a new setting. Then, according to a new input command and the like, the CPU 1 programs the DMA controller 10 and the audio input/output devices 8-1 to 8-3 at step 4-15, and advances to step 4-16 to restart the DMA operation. The CPU 1 executes the interrupt routine operation of FIG. 5 as done at step 4-8, and then returns to step 4-9.

In the playing/recording mode, after the initialization at steps 4-4 to 4-8, the CPU 1 repeatedly executes the processes at steps 4-9, 4-10, 4-12, 4-13, 4-14, 4-15 and 4-16. In response to a change command from the keyboard 4 (e.g., a pause (stop of A/D or D/A conversion) or a punch in/out (switching between A/D or D/A conversion) or a change in the control data obtained in the editing mode), the CPU 1 immediately stops the DMA transfer control operation, changes the program, and then restarts the similar processing.

Judging at step 3-2 that a control track preparation control mode has been set, the CPU 1 advances from step 3-2 to step 3-4, where it prepares the event control track. Before preparation of this event control track, the CPU 1 modifies the audio data into event data. The modification of the audio data into event data means that the CPU 1 divides the audio data which is continuously disposed on a time axis into a plurality of sectioned audio data, and generates event numbers for identifying these sectioned audio data and data (a start point and an end point) for representing a section of the sectioned audio data. These event numbers, start points and end points of the sectioned audio data are registered on the event address table (EAT) in the RAM 3. The start point and end point of the sectioned audio data correspond to a start address and end address of the event stored on the hard disk 12. An example of the event address table is shown in FIG. 13, as described above.

After the audio data has been modified into event data, the individual control track (ICT) is prepared. In the individual control track (ICT), the event identifying index data (the event number) which designate individual events and are included in the event address table (EAT) are disposed in order of reproduction of the events for the respective tracks.

A description of processing for preparing the individual control track (ICT) will now be given. It is assumed that time is known in this processing. The CPU 1 indicates the time axis and the end point En-1 of the previous event on the display device 5. Then, an editor (a user) designates an input track, an input event, and its start and end point through key operation of the keyboard 4. The CPU 1 compares the start point Sn of the input event designated by the key operation with the end point En-1 of the previous event. If the former is larger than the latter, the CPU 1 writes a time corresponding to the start point Sn of the input event and its event number in the individual track schedule (ITS), and calculates the end point En of the input event from the event address table (EAT). If the start point Sn of the input event is smaller than the end point En-1 of the previous event or if the both are equivalent to each other, the CPU 1 waits for another input track, input event and its start point to be designated by the editor. The processing described above will be repeatedly executed for preparing the individual control track (ICT) as well as the individual track schedule (ITS) until the editor inputs an end command through the keyboard 4.

Upon detection of the termination of the control track preparation control mode, the CPU 1 checks the key input state at step 3-1, again.

When the CPU 1 judges at step 3-2 that the editing mode (EDIT) has been set, it advances from step 3-2 to step 3-5. At step 3-5, the CPU 1 judges which tracks or which points should be edited or how they should be edited (for example, a timing of generation of a sound recorded at a determined time point is shifted before or after, or modified, and the sound is eliminated), and performs various editing operations.

The editing operations include processing (herein after referred to as gate processing) for detecting and eliminating soundless portion data in the audio data stored in the hard disk 12 and for storing right after previously stored sound portion data sound portion data (a sound sub-event) following the detected soundless portion data, and processing for preparing the gate address table in the gate processing.

Figure 9:
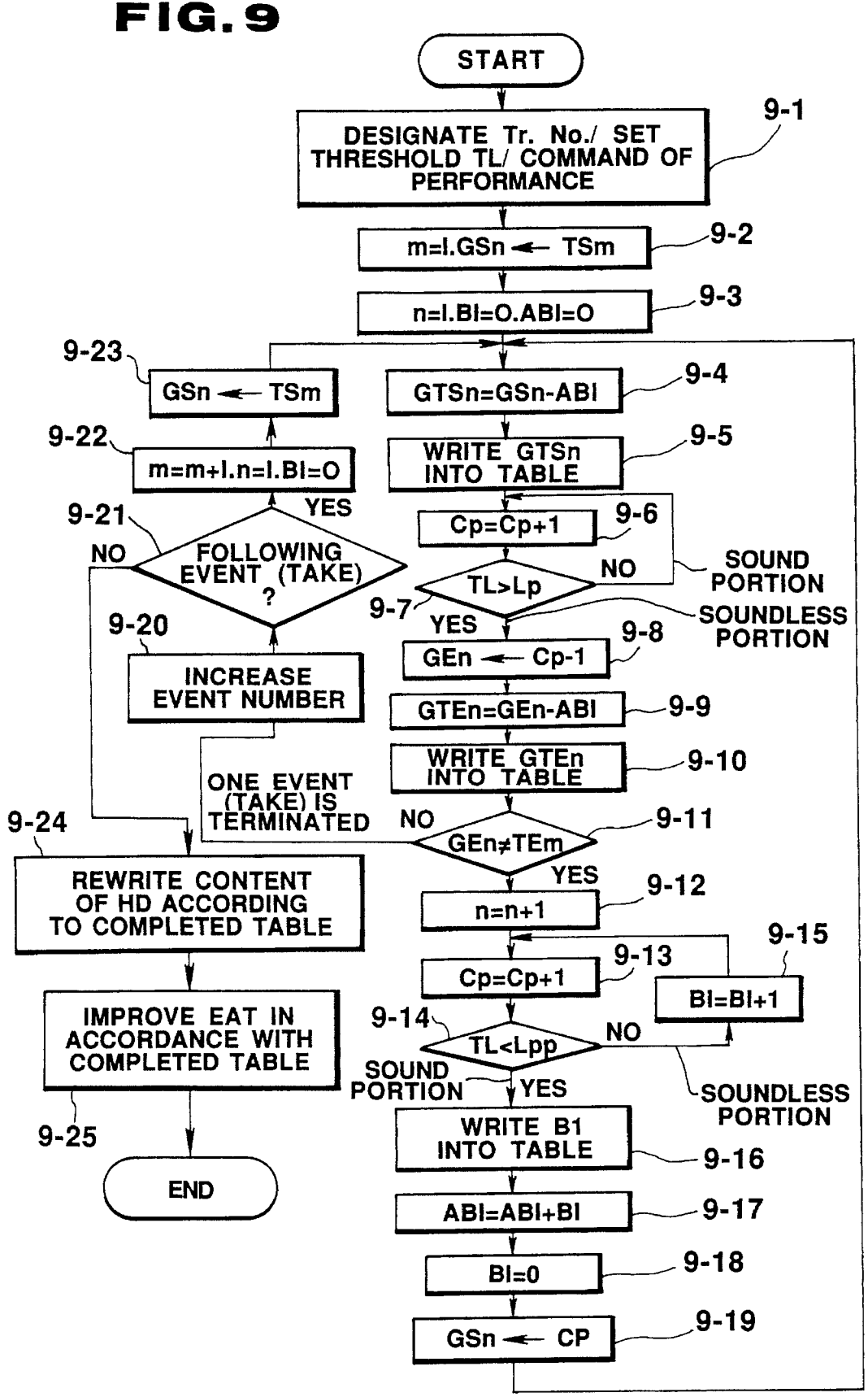
FIG. 9 is a flowchart illustrating the gate processing and operation for preparing a gate address table by the CUP 1.

FIG. 9 is a flowchart showing by example the gate processing and the processing for preparing the gate address table. Hereafter, the event which has been stored in the hard disk 12 in the initial recording mode is referred to as TAKE. At step 9-1, the CPU 1 designates a track, sets a threshold TL to judge whether or not it is a sound portion, and issues a command to perform the gate processing. At the following step 9-2, the CPU 1 sets the event number m to "1", and further sets the start address TSm (for example, 0000000) of the event 1 (TAKE) on the hard disk 12 as the start address Gsn of the sound sub-event 1 on the hard disk 12. Then, the CPU 1 sets the event number m of the sound sub-event 1 to "1", and sets a length of a portion of a level less than the threshold TL, which is referred to as a soundless portion, i.e., a blanking length B1 to "0" and further sets an accumulated value AB1 of the blanking lengths B1 to "0" (at step 9-3).

The CPU 1 calculates at step 9-5 the new start address GTSn of the sound sub-event 1 from the following equation:

$$GTSn=GSn-AB1$$

and writes the calculated value (for example, 0000000) in the gate address table at step 9-5. Then, the CPU 1 transfers a reference point CP on the hard disk 12 to the next at step 9-6, and compares at step 9-7 a peak level LP of the audio data between the reference point CP and a predetermined number therefrom, for example 2400 samples, with the threshold TL. If the former is not smaller than the latter, the CPU 1 judges that sound portion data is continuing and repeats the steps 9-6 and 9-7. If the threshold TL is larger than the above peak value LP, the CPU 1 judges that soundless portion data is reached and sets at step 9-8 the address preceding to the reference point CP as the end address GEn of the sound sub-event 1. Then, the CPU 1 calculates at step 9-9 the new end address GEn of the sound sub-event 1 from the following equation:

$$GTEn=GEn-AB1$$

and writes at step 9-10 the calculated value (for example, 15000) in the gate address table.

At step 9-11, the CPU 1 compares the previous end address GEn of the sound sub-event 1 with the end address TEm of the event 1 (TAKE) on the hard disk 12. If both the addresses are equivalent to each other, the CPU 1 terminates the gate processing of the first event (TAKE), and increases the event number by one and performs the gate processing of the following event.

If it is judged at step 9-11 that the previous end address GEn of the sound sub-event 1 and the end address TEm of the event 1 (TAKE) on the hard disk 12 are not equivalent to each other, the CPU 1 continues to perform the gate processing at step 9-12, increasing the event number n of the sound event by one and setting it to "2". Then, the CPU 1 transfers the reference point CP on the hard disk 12 to the next point at step 9-13, and compares at step 9-14 a level LPP of the audio data at the next point on the hard disk 12 with the threshold TL. If the former is not larger than the latter, the CPU 1 judges that it is a soundless portion, and increases the blanking length B1 by one at step 9-15. The CPU 1 repeats steps 9-13, 9-14 and 9-15 until the level LPP of the audio data will become larger than the threshold TL.

If the CPU 1 confirms that the level LPP of the audio data at the reference point CP on the hard disk 12 becomes larger than the threshold TL, the CPU 1 judges that the following sub-event 2 has been reached, and writes the blanking length B1 (for example, 2000) obtained at step 9-15 into a column of the blanking length of the sound sub-event 1 in the gate address table (step 9-16, refer to FIG. 13).

The CPU 1 adds the blanking length B1 to the accumulated blanking length AB1 previously obtained, obtaining a new accumulated value AB1 of the blanking length B1 at step 9-18. The CPU 1 resets the blanking length B1 to "0" at step 9-18, and sets at step 9-19 a present reference point CP (for example, 17001) on the hard disk 12 as the start address GSn of the sound subevent 2.

Then, the CPU 1 returns to step 9-4, where the CPU 1 subtracts the accumulated value AB1 (for example, 2000) of the blanking length B1 from the start address GSn (for example, 17001) of the sound sub-event 2 obtained as mentioned above. Performing steps 9-5 to 9-16 in a similar manner, the CPU 1 obtains the end address (for example, 239000) of the sound sub-event 2 and a blanking length (for example, 19087) equivalent to a length of the soundless portion following the sound sub-event 2. Further, performing steps 9-17 to 9-19 and 9-4, the CPU 1 obtains the start address GTSn (for example, 239001) of a sound sub-event 3.

When the CPU 1 has prepared the gate address table for all the sound sub-events (the sound sub-events 1 through 4, in FIG. 13) involved in the event 1 (TAKE) through the processing at steps 9-4 to 9-19, the end address TEm of the event 1 will be equivalent to the end address GEn of the final sound sub-event 4 before the gate processing (before storing sound sub-event right after previously stored sound subevent to eliminate soundless portion data) (the result of comparison at step 9-11 is "No"). The CPU 1 increases the event number of the gate address table by one at step 9-20, and checks at step 9-21 whether or not there follows another event. If another event is present, the CPU 1 increases the event number m by one (in the above instance, the event number m is set to "2"), sets the sound sub-event number n to "1", and sets the blanking length B1 to "0" at step 9-22. Further, the CPU 1 sets at step 9-23 the start address TSm of the following event to the start address GSn of the initial sound sub-event, and performs steps 9-4 to 9-19, again.

If no other event is present, the CPU 1 rewrites the contents of the hard disk 12 in accordance with the completely prepared gate address table. More specifically, the CPU 1 eliminates soundless portion data and stores the sound portion data (the sound sub-event) following the soundless portion data right after the previously stored sound portion data. The CPU 1 also improves the event address table in accordance with the gate address table at step 9-25.

When termination of the editing operation including the above gate processing is detected, the CPU checks at step 3-1 the key input, again.

<Operation of Audio Input/Output Devices 8-1 to 8-3>

The operation of the audio input/output devices 8-1 to 8-3 will now be described referring to the flowchart of FIG. 6. This flowchart may be realized by either microprogram control or hard logic control, and there are various types of means to accomplish the function.

It is determined at step 6-1 whether or not the signal CS for designating the audio input/output devices has been sent from the CPU 1, i.e., whether the signal is active or not. When the result of the judgement is "Yes", the operation mode (record, play, stop or the like) is set by the CPU 1 at step 6-2. This setting process is to be executed in response to processing at steps 4-5 and 4-15 in the main routine of the CPU 1 shown in FIG. 4.

When the result of the judgement at step 6-1 is "No", it is judged at step 6-3 if the audio input/output devices 8-1 to 8-3 are in the recording mode or in the playing mode. If it is judged at step 6-3 that the devices are in the recording mode, the sequence of processes will be executed at steps 6-4 to 6-9, and if it is judged at step 6-3 that the devices are in the playing mode, the flow goes to steps 6-10 to 6-15 for execution of the sequence of processes.

A description will be given of the operation of the audio input/output devices set to the recording mode (the audio input/output devices 8-2 and 8-3 in this case). It is judged at step 6-4 if a sampling time is reached. The processing at step 6-4 will be repeated until the sampling time is reached. The audio input/output devices 8-1 to 8-3 may have hardware timers respectively, and judge the sampling time from their outputs. Or a common hard timer may be provided so that each audio input/output device can be driven by the timer output. It will be understood from the later description that the sampling frequencies of the audio input/output devices 8-1 to 8-3 may be set to values different from one another.

When the decision at step 6-4 is "Yes", the transferred analog audio signal is subject to sample holding (S/H) and A/D conversion. The audio input/output devices set the DMA transfer request DRQ active and output it to the DMA controller 10 at step 7-6.

Receiving the DMA transfer request DRQ, the DMA controller 10 outputs the response signal DAK to execute DMA transfer (the detailed operation will be described later). When the result of the judgement at step 6-7 is "Yes", the audio input/output device 8-1, 8-2 or 8-3 (the audio input/output devices 8-2 or 8-3 in this case) go to step 6-8, where the device outputs the audio data subjected to A/D conversion via the data bus to the corresponding buffer 9-1, 9-2 or 9-3 (the buffer 9-2 or 9-3 in this case). The DMA transfer request DRQ is then set inactive at step 6-9. Therefore, the audio input/output device 8-2 or 8-3 in this case converts, every sampling period, the externally supplied analog audio signal into a digital audio signal, and transfers it to the current address of the buffer 9-2 or 9-3 which is designated by the DMA controller 10, as will be described later (refer to FIG. 10).

When it is judged at step 6-3 that the audio input/output device is set to the playing mode, the operation goes to step 6-10, where the DMA transfer request DRQ to the DMA controller 10 is made active. Upon receipt of the response signal DAK from the DMA controller 10 at step 6-11, the audio input/output device reads the digital audio data on the data bus at step 6-12, and then sets the DMA transfer request DRQ inactive at step 6-13. As shown in FIG. 10, through the above operation, the content of the current address of the buffer 9-1 corresponding to the track Tr1 (where the content of the Tr1 area of the hard disk 12 has been transferred and stored) will be set to the audio input/output device 8-1. The operation of the DMA controller 10 in this case will be described later. Then, it is judged at step 6-14 if the sampling time is reached. The detection of the sampling time is effected in the same manner as at step 6-4.

When it is judged at step 6-14 that the sampling time is reached, the operation goes to step 6-15, where the digital audio signal is subjected to D/A conversion and low-pass filtering operation. Then, the analog audio signal is audibly output.

The operations in the recording mode and the playing mode at a single sampling time have been described. After the processes at steps 6-9 and 6-15 have been executed, the operation returns to step 6-1 to sequentially execute the processing at the sampling time in the same manner.

Figure 11:
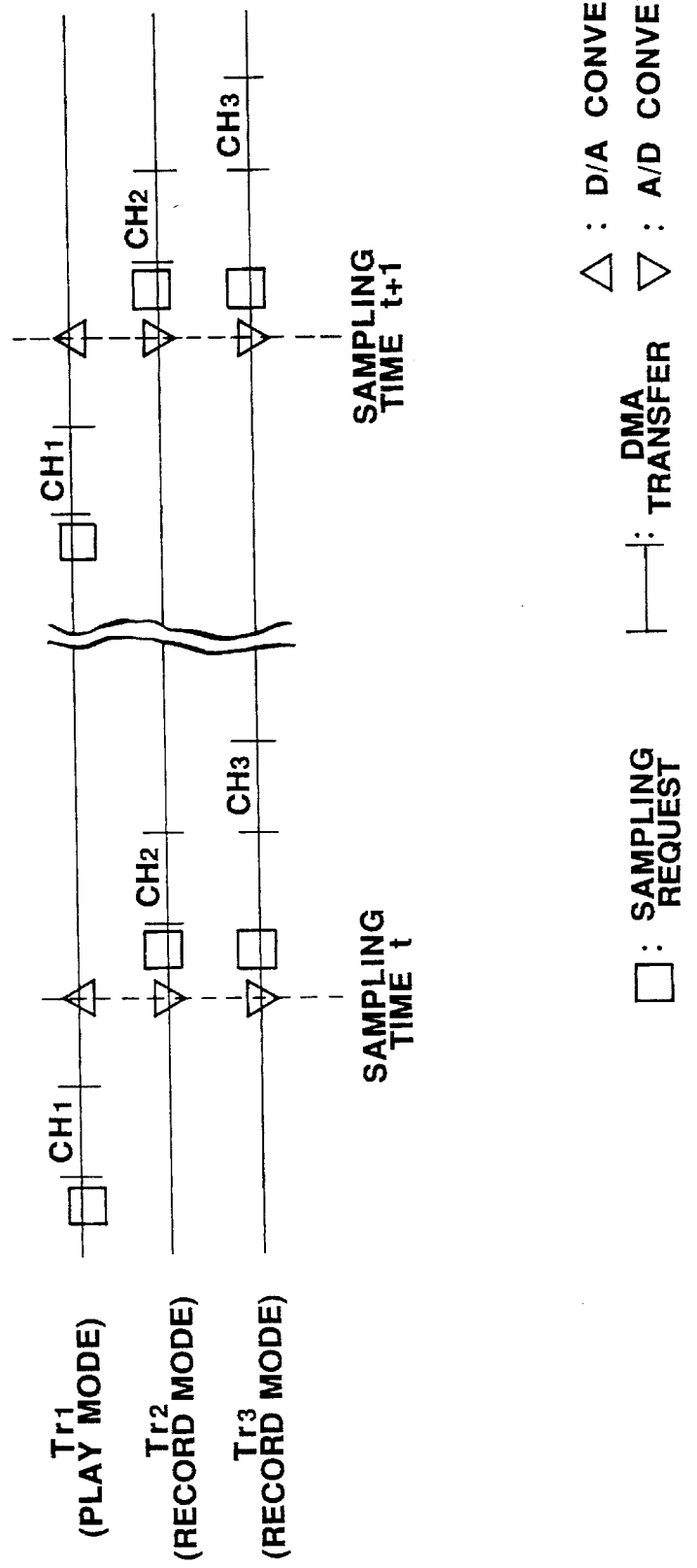
FIG. 11 is a time chart illustrating D/A conversion, A/D conversion, and DMA transfer for respective tracks in the digital recorder of FIG. 1.

FIG. 11 is a time chart of the operation of the audio input/output devices 8-1 to 8-3. In this time chart, the audio input/output device 8-1 for the Tr1 is in the playing mode, and the sampling request signal (DRQ) is generated between the sampling times t and t+1. The DMA transfer is executed from the buffer 9-1 to the audio input/output device 8-1 under control of the channel CH1 in the DMA controller 10, and the D/A conversion is performed in synchronism with the sampling time t+1.

The audio input/output devices 8-2 and 8-3 of the respective Tr2 and Tr3 are in the recording mode. In synchronism with the sampling time t or t+1, A/D conversion is executed, and then the DMA transfer command is output to the DMA controller 10. The DMA transfer is executed in order of Tr2 and Tr3, (because the priority order is CH1>CH2>CH3>CH4 when the DMA requests are simultaneously made), and data will be transferred from the audio input/output device 8-2 or 8-3 to the buffer 9-2 or 9-3.

<Operation of DMA controller 10>

The operation of the DMA controller 10 will be described referring to FIG. 7. The flowchart of FIG. 7 may illustrate that the service controller 108 of FIG. 2 operates under control of the microprogram control, or that the DMA controller 10 realizes its function by a hardware logic.

It is judged at step 7-1 if the designating signal CS has been supplied from the CPU 1 (i.e., if the signal CS has been made active). When the signal is active, it is judged which signal, a read signal RD or a write signal WR, is supplied from the CPU 1. When the read signal RD is supplied, the operation goes to step 7-3, where the contents of the registers, which are designated by the address signals supplied via the address bus are output on the data bus, so that the CPU 1 can read them. When the write signal WR is supplied, the operation goes to step 7-4, where desired data will be set to the designated register via the data bus. The processes at steps 7-3 and 7-4 correspond to those at steps 4-5 and 4-15 in the main routine operation of the CPU 1. Accordingly, the desired data will be set to the registers 104 and 105 of FIG. 2 respectively through the process at step 7-4.

When the CPU 1 terminates the accessing to or the programming of the DMA controller 10, the designating signal CS is set inactive, and the operation goes from step 7-1 to step 7-5.

It is judged at step 7-5 if the DMA transfer requests DRQ1 to DRQ3 are supplied from the respective audio input/output devices 8-1 to 8-3, or if the DMA transfer request DREQ (DRQ4) is supplied from the HD controller 11. When the request is sent from any of the components, the operation goes to step 7-6, where the DMA enable signal DMAENB is set to "1" or active. Accordingly, only the DMA controller 10 uses the address bus and the data bus in the DMA unit, disabling any access from the CPU 1.

When multiple requests are made, the DMA controller 10 successively selects channels at step 7-7 in priority order of the channel, from CH1 down to CH4. In FIG. 11, for instance, though the data transfer requests are simultaneously made from the audio input/output devices 8-2 and 8-3 of the respective Tr2 and Tr3 immediately after the sampling operation, the DMA transfer of the CH2 is executed first because the Tr2 is given priority over the Tr3. As will be understood from the later description, since the CH4 is given the lowest priority, when a data transfer request is made from any of the audio input/output devices 8-1 to 8-3 while the data transfer is going on between the hard disk 12 and one of the buffers 9-1 to 9-3, the data transfer to the audio input/output device will be carried on by priority.

Then, the DMA controller 10 outputs at step 7-8 the current address (the content of the current address register of CH2 of the address register 104) of the selected channel (the CH2 in this case) to the address bus. Referring to the content of the control register 105 of the selected channel (CH2 in this case), the DMA controller 10 decides at step 7-9 in which direction the DMA transfer is to be effected. When the DMA controller 10 decides to transfer data from the buffers 9-1 to 9-3 to the other components (I/O), the operation goes from step 7-10 to step 7-11, where the DMA controller 10 supplies the read signal RD to the buffer selected from among the buffers 9-1 to 9-3. When the data is to be transferred from the other components (I/O) to the buffers 9-1 to 9-3, the operation goes to step 7-12, where the DMA controller 10 supplies the write signal WR to the buffer selected from among the buffers 9-1 to 9-3.

At step 7-13 the response signal DAK is made active. As a result, the audio input/output device 8-2 of the Tr2 will output to the data bus audio data sampled in the processes at steps 6-7 and 6-8 of FIG. 6, and the DMA controller 10 will write the sampled audio data at the current address area in the buffer 9-2, as shown in FIG. 10.

At step 7-14, since the data transfer has been terminated, the read signal RD or the write signal WR, and the response signal DAK are set inactive. At step 7-15, the DMA controller 10 increments the content at the current address (in the address register 104 of FIG. 2) of the channel (CH2 in this case) by one. The content at the current address (in the address register 104 of FIG. 2) of the channel (CH2 in this case) is to be increased through the process at step 7-15, every time other sampled audio data is written into or read out from the buffers 9-1 to 9-3. The operation returns from step 7-15 to step 7-1.

In the aforementioned case (refer to FIG. 11), the audio input/output devices 8-2 and 8-3 of Tr2 and Tr3 have made request for data transfer to the DMA controller 10 and the data transfer has been executed only in Tr2. Therefore, the DMA controller 10 judges "Yes" at step 7-5. Through the processes at steps 7-7 to 7-10, 7-12 to 7-15, data is transferred in Tr3 from the audio input/output device 8-3 to the buffer 9-3 in the same manner as above.

After the data transfer is terminated, the operation advances from step 7-5 to step 7-16, where the DMA controller 10 sets the DMA enabling signal to "0" (inactive). Then, the DMA controller 10 is prohibited from occupying the data bus and the address bus in the DMA unit, allowing the CPU 1 to access these buses.

With respect to the Tr2 and Tr3, the description of the data transfer from the audio input/output devices 8-2 and 8-3 to the respective buffers 9-2 and 9-3 has been given. Concerning Tr1, the DMA controller 10 executes data transfer in the opposite direction, i.e., from the buffer 9-1 to the audio input/output device 8-1.

Figure 6:
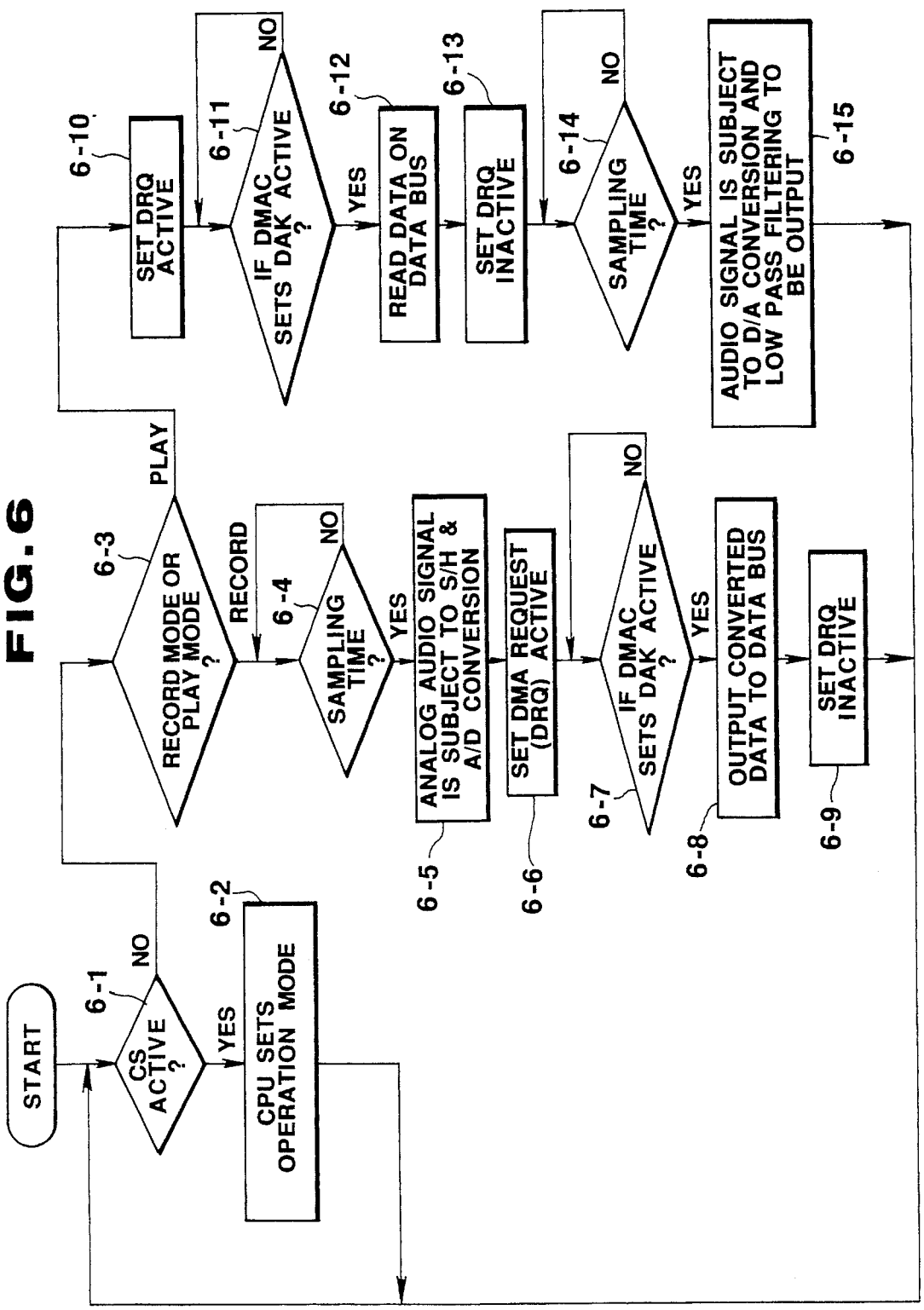
FIG. 6 is a flowchart illustrating operation of audio input/output devices 8-1 to 8-3 of FIG. 1.

As shown in FIG. 11, the audio input/output device 8-1 corresponding to Tr1 outputs the request signal DRQ to the DMA controller 10 during the period between the sampling times t and t+1 (at step 6-10 of FIG. 6).

In response to the request signal DRQ, the DMA controller 10 performs the processes at steps 7-5 to 7-7 in the same manner as above, and supplies the audio input/output device 8-1 through the address bus with an address data indicating an address from which data is to be read out from the buffer 9-1. After execution of the processes at steps 7-9 and 7-10, the DMA controller 10 advances to step 7-11, where it supplies the read signal RD to the buffer 9-1. At step 7-13, the DMA controller 10 sets the response signal DAK to "1".

As a result, the digital audio data at the designated address in the buffer 9-1 is transferred to and written into the audio input/output 8-1 of Tr1 via the data bus. Then, the DMA controller 10 returns to step 7-1.

The DMA controller 10 executes data transfer between the hard disk 12 and the buffers 9-1 to 9-3, using the address register 104 and the control register 105 in the channel CH4. This operation will be carried out after the CPU 1 performs the interrupt routine operation of FIG. 5 to set and control the DMA controller 10 and program the HD controller 11.

The CPU 1 sets and controls the DMA controller 10 while the DMA controller 10 performs the processes at steps 7-3 and 7-4 in response to the above operation of the CPU 1. More specifically, the CPU 1 decides a track to which data is to be transferred through the channel CH4 and sets the start address (i.e., the address following the address of the block data which has previously been transferred between the buffer and the hard disk 12) of the buffer corresponding to the track decided above to the start address register (the address register 104 of FIG. 2) of CH4. The CPU 1 obtains the number of data transfer in the track Tr1 executed this time from the difference between the start address and the current address (the address incremented after the previous data transfer is executed between the buffer and the hard disk 12), and copies the current address in this track Tr1 to the start address.

The CPU 1 will execute data transfer between the buffers 9-1 to 9-3 corresponding to the track in operation and the hard disk 12 sequentially track by track, and the data transfer following the previous data transfer (block transfer) will be executed for each track. In the instance shown in FIG. 10, with respect to Tr1, the data amount which corresponds to the empty space in the buffer 9-1 defined by the start address (CH1) and the current address (CH1) is to be transferred from the hard disk 12 to the buffer 9-1. (With respect to the other tracks Tr2 and Tr3, it will be apparent that, though the direction of the data transfer is opposite, data transfer will be executed from the buffers 9-2 and 9-3 to the hard disk 12 under control of the DMA controller 10.) In the buffer 9-1 in the playing mode and the buffers 9-2 and 9-3, the shaded portions correspond to the audio data which has been received.

The CPU 1 programs the HD controller 11, and then allows the HD controller 11 to request an actual data transfer and start the DMA transfer.

Detecting the data transfer request made by the HD controller 11 at step 7-5, the DMA controller 11 performs the processes at steps 7-6 to 7-9 as performed above, and then goes to step 7-10, where it judges whether the data transfer from the buffers 9-1 to 9-3 to the hard disk 12 is requested or the data transfer in the opposite direction is requested. When the former transfer is requested, the operation goes to step 7-11. When the latter transfer is requested, the operation goes to step 7-12, and then the process at steps 7-13 to 7-15 is executed. In this case, since digital audio data for one sample is transferred in a single transfer operation, the block transfer will be done by repeatedly executing the processes at steps 7-5 to 7-15 for several times. The data transfer between the hard disk 12 and the buffers 9-1 to 9-3 will be further described later because the operation of the HD controller 11 is involved greatly.

When the DMA transfer is completed, the transfer requests DRQ1 to DRQ4 will not be sent forth, and the operation advances from step 7-5 to step 7-16, where the DMA controller 10 sets the DMA enabling signal DMAENB to "0" (inactive).

<Operation of HD Controller 11>

The operation of the HD controller 11 will now be explained referring to FIG. 8. The HD controller 11 may be realized by either a hardware logic or microprogram control; in either case, the operational flow in FIG. 8 can be accomplished.

First, it is determined whether or not the designation signal CS has been given from the CPU 1 (step 8-1); this signal is applied by the interrupt routine of the CPU 1. If the decision is negative (NO), the operation returns to step 8-1 again, but if the decision is positive (YES), the operation goes to step 8-2. At this step 8-2, it is determined whether the read signal RD or the write signal WD is sent from the CPU 1. If it is the read signal RD, the designated data in the HD controller 11 (the content of the address register or the like) is sent through the data bus to the CPU 1.

If the write signal WR has been given from the CPU 1, the operation moves from step 8-2 to step 8-4 to set the direction of DMA transfer between buffer and hard disk 12 which are the present targets for DMA transfer to be conducted by the channel CH4 of the DMA controller 10. At the next step 8-5, the access point of the hard disk 12 to be accessed is set by the access pointer for the track which the CPU 1 has acquired from the RAM 3.

At the subsequent step 8-6, the number of transfer data (the number of digital voice data) is set in an internal counter of the HD controller 11. This number of transfer data is obtained in the interrupt routine of the CPU 1, shown in FIG. 5.

As the processes at steps 8-4 to 8-6 are executed, the HD controller 11 is programmed under the control of the CPU 1. Then, the HD controller 11 requests the DMA controller to transfer data (step 8-7). It should be understood from the above that upon receipt of the interrupt signal INT from the HD controller 11, the CPU 1 executes the setup and control for the DMA transfer associated with the next track (in the order of the Tr 1, Tr 2, Tr 3, Tr 1, . . . provided that the Tr 1 to Tr 3 are all presently enabled) in the DMA controller 10. Then, the CPU 1 leaves the control of the HD controller 11 and DMA controller 10, permitting these controllers to perform the DMA transfer through the mutual interaction.

Figure 7:
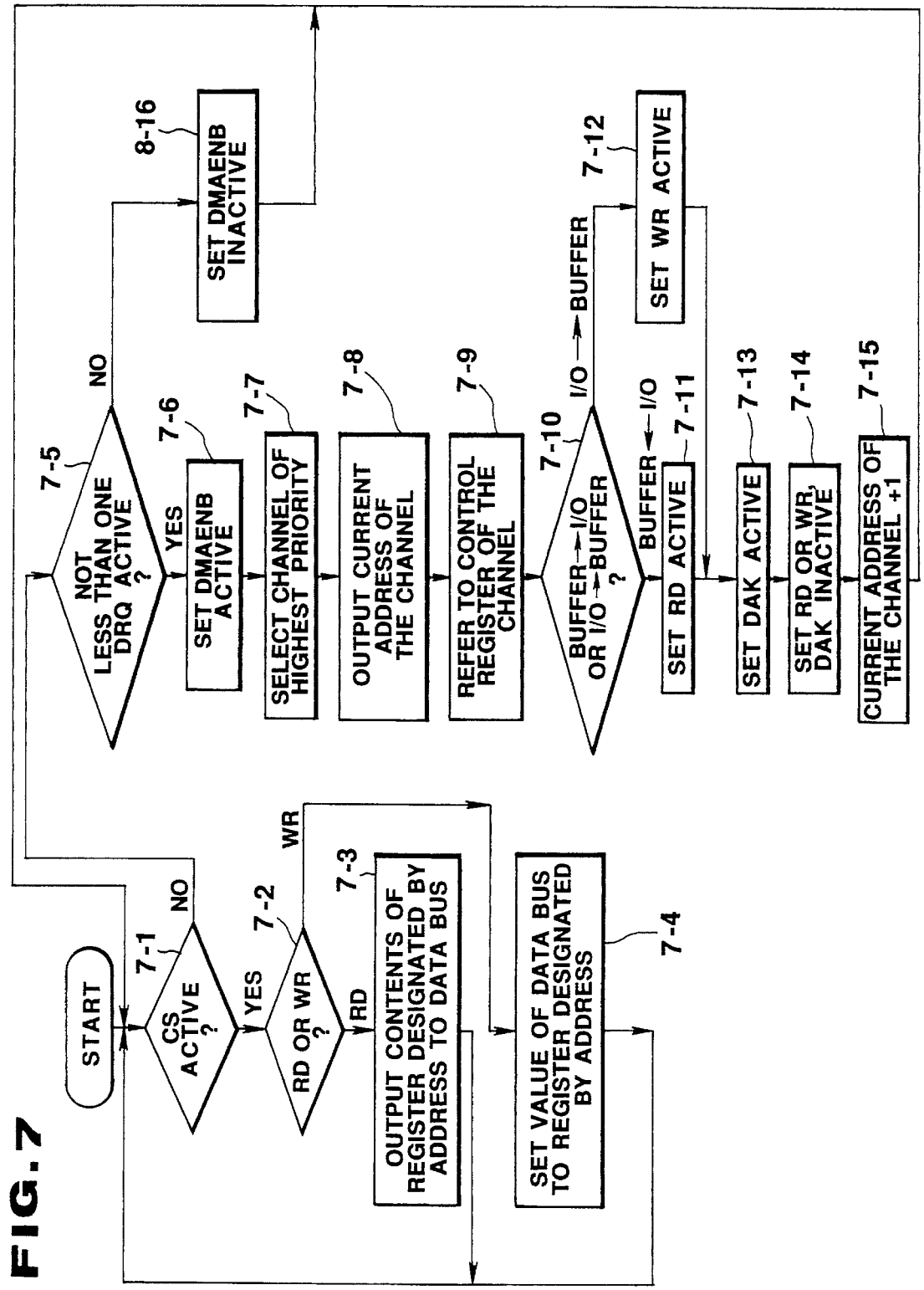
FIG. 7 is a flowchart illustrating operation of a DMA controller 10 of FIG. 1.

The process of the HD controller 11 moves from step 8-7 to 8-8, and repeats the process of step 8-8 until the HD controller 11 receives the response signal DACK (DAK4) from the DMA controller 10 (see step 7-13 of FIG. 7).

When the judgment at step 8-8 is affirmative (YES), the operation advances to step 8-9, where digital voice data of one sample is transferred by the CH4 of the DMA controller 10 to decrement the transfer counter set at step 8-6 by "1" (step 8-10). According to the content of the transfer counter, it is determined at step 8-11 whether transfer of a pre-set number of data has been completed. When the judgment is negative (NO), the operation returns to step 8-8. Therefore, the DMA controller 10 continues receiving the transfer request DRQ4 until the transfer of the pre-set amount of data (block transfer) from the HD controller 11 is completed. In response to the transfer request, the DMA controller 10 executes the processes at steps 7-5 to 7-15 while HD controller 11 performs the processes at steps 8-8 to 8-11.

When it is judged at step 8-11 that data transfer has been done, the operation moves to step 8-12, where the data transfer request DREQ (DRQ4) from the HD controller 11 to the DMA controller 10 is set to "0" (inactive). The HD controller 11 sends the interrupt signal INT to the CPU 1 to transfer data for the next track between the hard disk 12 and one of the buffers 9-1 to 9-3 (step 8-13). In response to this interrupt signal, the CPU 1 executes the interrupt routine shown in FIG. 5, as already described above.

<Operation of Data Transfer Between Hard Disk 12 and Buffers 9-1 to 9-3>

As data transfer between the hard disk 12 and the buffers 9-1 to 9-3 may be understood by now through the above explanation, a description will now be given of how the DMA request is made to the DMA controller 10 and how the DMA controller 10 responds to the request in a time-shared manner, referring to FIGS. 10 and 12.

As already explained, the Tr 1 is set in play mode and the Tr 2 and Tr 3 are rendered in record mode in FIG. 10. Every sampling time (fs in FIG. 12), the audio input/output devices 8-1 to 8-3 for the respective tracks request the DMA controller 10 to transfer data between the hard disk 12 and the buffers 9-1 to 9-3.

Figure 8:
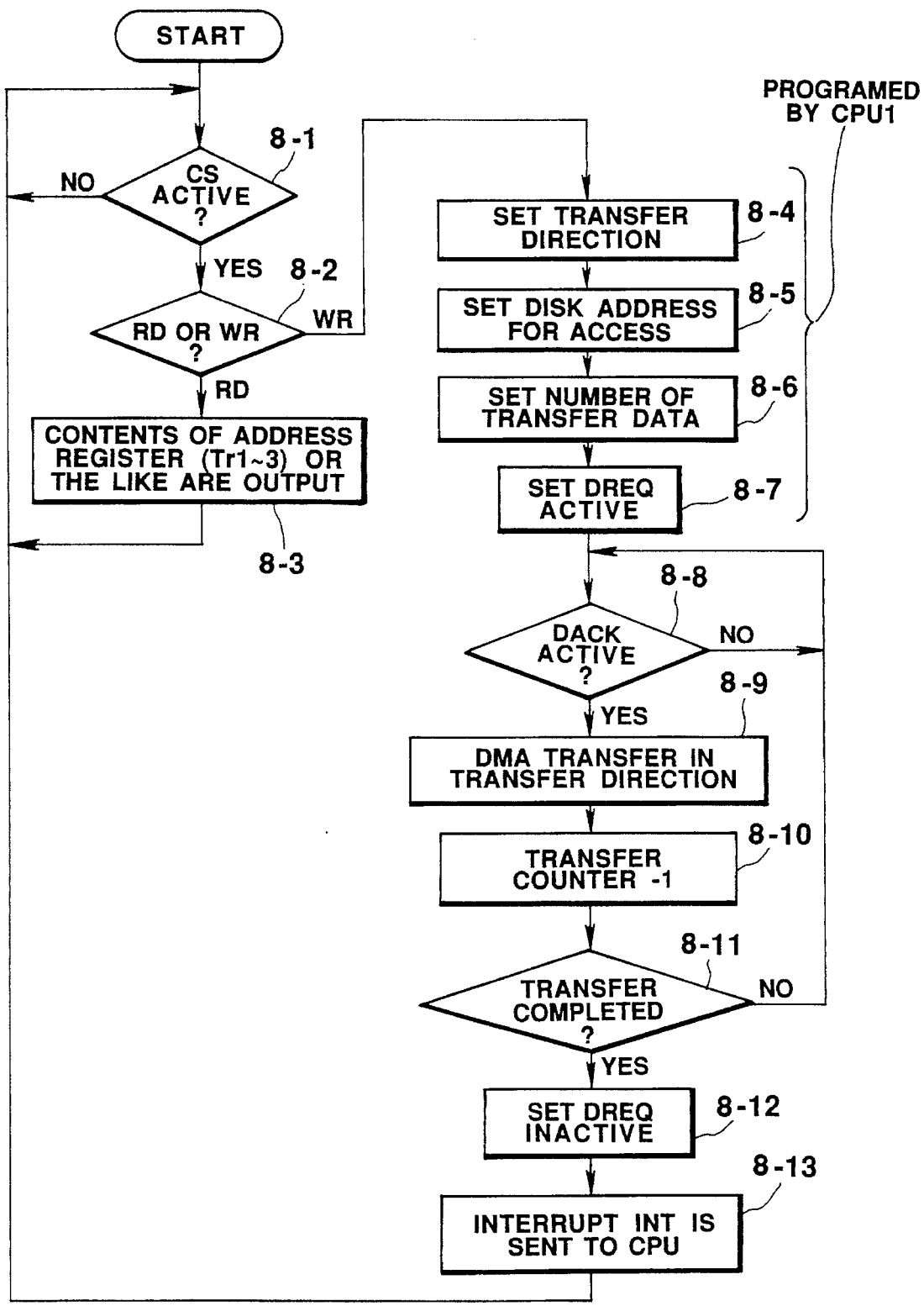
FIG. 8 is a flowchart illustrating operation of an HD controller 11 of FIG. 1.

This request is made while the CPU 1 is programming the HD controller 11 (steps 8-4 to 8-7 in FIG. 8). Upon reception of the data transfer requests from the audio input/output devices 8-1 to 8-3, the DMA controller 10 outputs the DMA enabling signal DMAENB as described above (step 7-6 in FIG. 7), disables the CPU 1 to program the HD controller 11 (WAIT), and then allows the CPU 1 to restart the programming after the DMA transfer by the channels CH1 to CH3 is completed (see FIG. 12).

Figure 12:
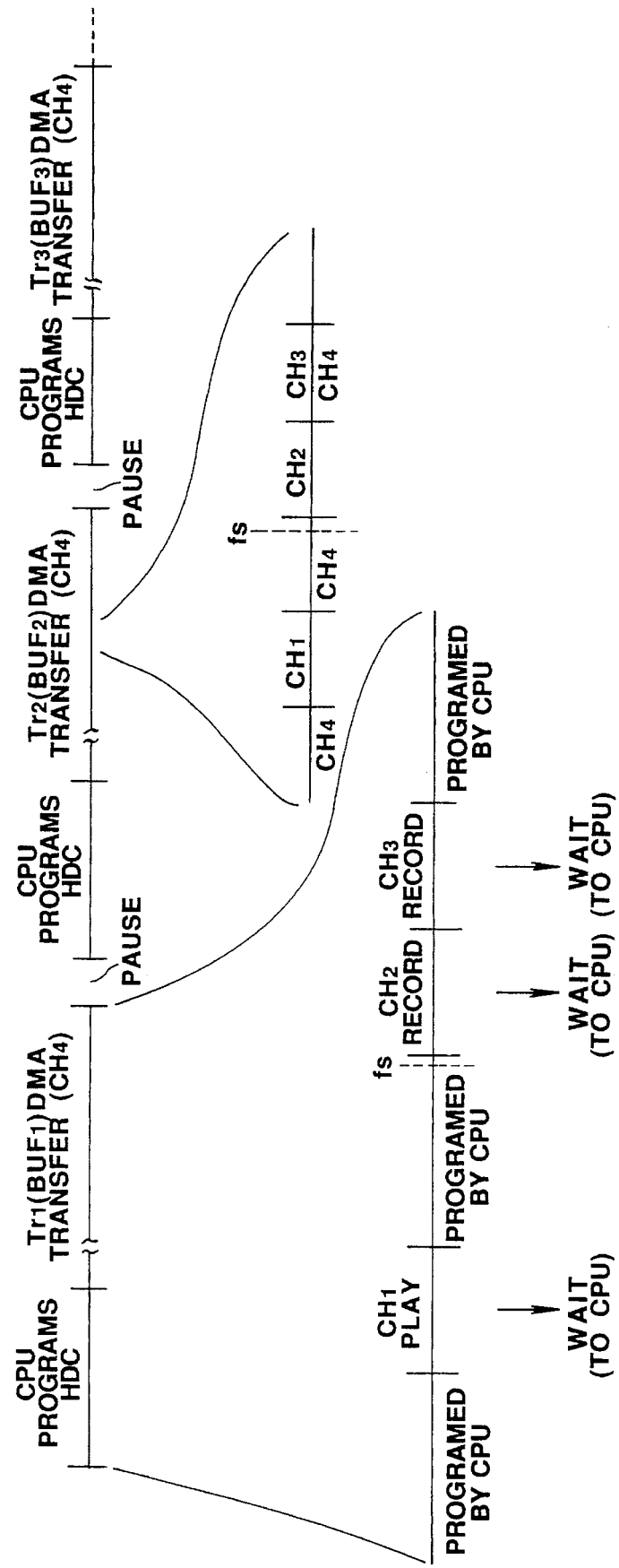
FIG. 12 is a time chart illustrating the DMA transfer between a hard disk 12 and buffers 9-1 to 9-3 in FIG. 1.

While data transfer between the hard disk 12 and the buffers 9-1 to 9-3 is performed by the DMA transfer through the channel CH4, data transfer requests are supplied from the audio input/output devices 8-1 to 8-3 every sampling time (fs in FIG. 12).

The DMA controller 10 this time transfers data of the channel (CH1 to CH3) which is given higher priority over the others based on the judgment made at step 7-7 in FIG. 7. Since the HD controller 11, though it keeps sending the data transfer request DRQ4 to the DMA controller 10, does not receive any response signal DAK4 from the DMA controller 10 (see step 8-7 in FIG. 8), the HD controller 11 has to wait for the next data transfer, i.e., the process at step 8-8 is repeated.

Therefore, macroscopically, the DMA controller 10 repeats DMA transfer (block transfer) between the hard disk 12 and the buffers 9-1 to 9-3 for the Tr1, Tr2 and Tr3 as shown in FIG. 12. Microscopically, however, even during programming of the HD controller 11, the actual DMA transfer (by CH4) or a pause (idling), the DMA controller 10 executes DMA transfer (single transfer) between the buffers 9-1 to 9-3 and the audio input/output devices 8-1 to 8-3 for the individual channels CH1 to CH3 for each sampling timing. The DMA controller 10 is also designed to sufficiently deal with high-speed A/D or D/A conversion.

In the above embodiment, zero data are previously stored in a predetermined area of the hard disk 12, and these zero data are repeatedly read out for generating soundless portion data, but these zero data may be stored in other memory areas such as the RAM 3 and a generating means may be provided which is specialized in generating zero data.

<Structure of the Second Embodiment>

The second embodiment of the present invention will be described hereafter. The second embodiment is arranged such that soundless portion data (break data) of a given length can be added to the designated event on the hard disk 12. The structure of the second embodiment is almost similar to that of the first embodiment of FIG. 1, but a soundless portion data applying unit (address on the hard disk 12) and a break address table shown in FIG. 18 for storing a length (a break length) of soundless portion data are memorized in RAM 3. The break address table is similar to the gate address table described referring to FIG. 13, in which soundless portion data are compulsory inserted before and/or after the original sound portion data or between them. The keyboard 4 is provided with a break key for applying a soundless portion.

<Processing by the CPU 1>

The processing performed by the CPU 1 in the second embodiment is substantially similar to that in the first embodiment, but different in processing for applying a break.

When the CPU 1 judges at step 3-2 of FIG. 3 that the editing mode (EDIT) has been set, it advances from step 3-2 to step 3-5. At step 3-5, the CPU 1 judges which tracks or which points should be edited or how they should be edited (for example, a timing of generation of a sound recorded at a determined time point is shifted before or after, or modified, and the sound is eliminated), and performs various editing operations.

In the editing operations are included processing (hereinafter referred to as break processing) for inserting soundless portion data of a predetermined length at a predetermined point into the audio data stored in the hard disk 12 so as to divide the audio data into sound portion data (sound sub-event) following the inserted soundless portion data and the foregoing audio data, and processing for preparing the break address table.

Figure 14:
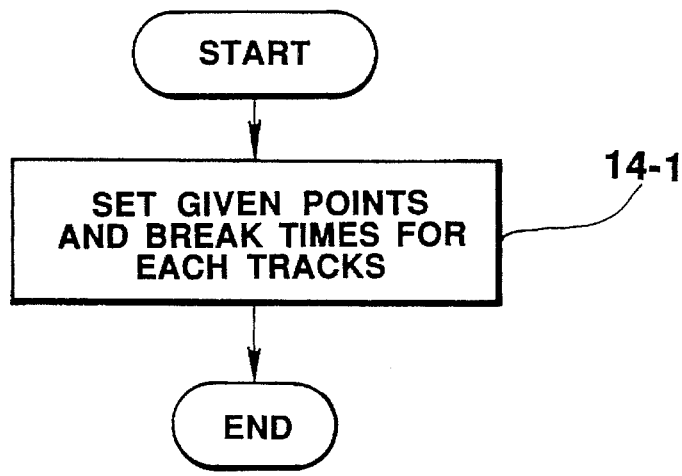
FIG. 14 is a flowchart illustrating break processing of the CPU 1 and its operation for preparing a break address table.
Figure 16:
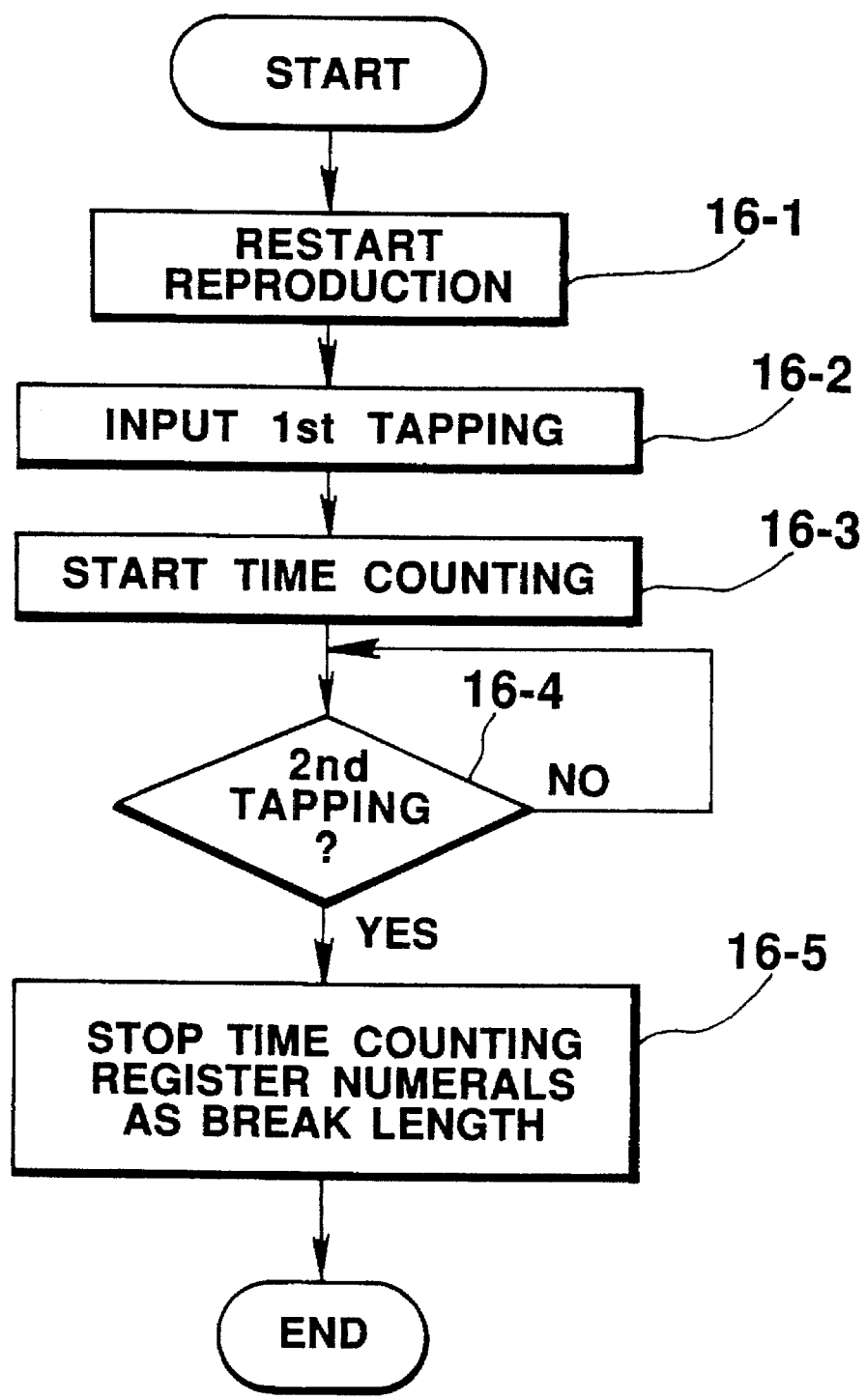
FIG. 16 is a flowchart illustrating yet another example of the break processing of the CPU 1 and its operation for preparing the break address table.

FIGS. 14 and 16 are flow charts illustrating the break processing and process in which the break address table is prepared. In the embodiment of FIG. 14, a given point at which the break is set and a given break time are set at step 14-1. These settings are performed by operating a predetermined key of the keyboard 4. Once the break and its time have been set, the relevant break address table will be prepared.

Figure 18:
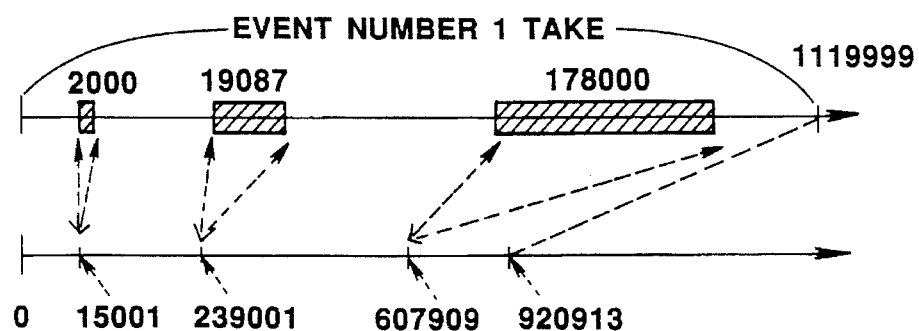
FIG. 18 is a view for explaining an interrelation among the event address table, the break address table and the break processing.

The above processing will be described referring to FIG. 18. Now, we assume that audio signal of the event number 1 has been stored on the original track 1 of the hard disk 12, and its start point is at "0000000" and its end address is at "0920913". If a command is issued to set breaks having lengths 0002000, 0019087 and 0178000 at points 0015001, 0239001, and 0607909 respectively, the audio signal of the event number 1 is divided into four sound sub-events.

The sound sub-event 1 comprises data having the start point 0000000 and the end point 0015000. Similarly, the sound sub-event 2 comprises data having the start point 0015001 and the end point 0239000, the sound sub-event 3 comprises data having its start point 0239001 and end point 0607908, and the sound sub-event 4 comprises data having its start point 0607909 and its end point 0920912. A break having a length 0002000 is formed between the sound sub-events 1 and 2, a break of a length 0019087 is formed between the sound sub-events 2 and 3, and a break of a length 178000 is formed between the sound sub-events 3 and 4. The "TAKE" of the resultant event number 1 including breaks as mentioned above will have its start point at "00000000" and its end point at "11199999".

An instance in which breaks are formed on a single track has been described above, but breaks having given lengths may be formed at given points on other tracks in a similar manner.

Figure 17:
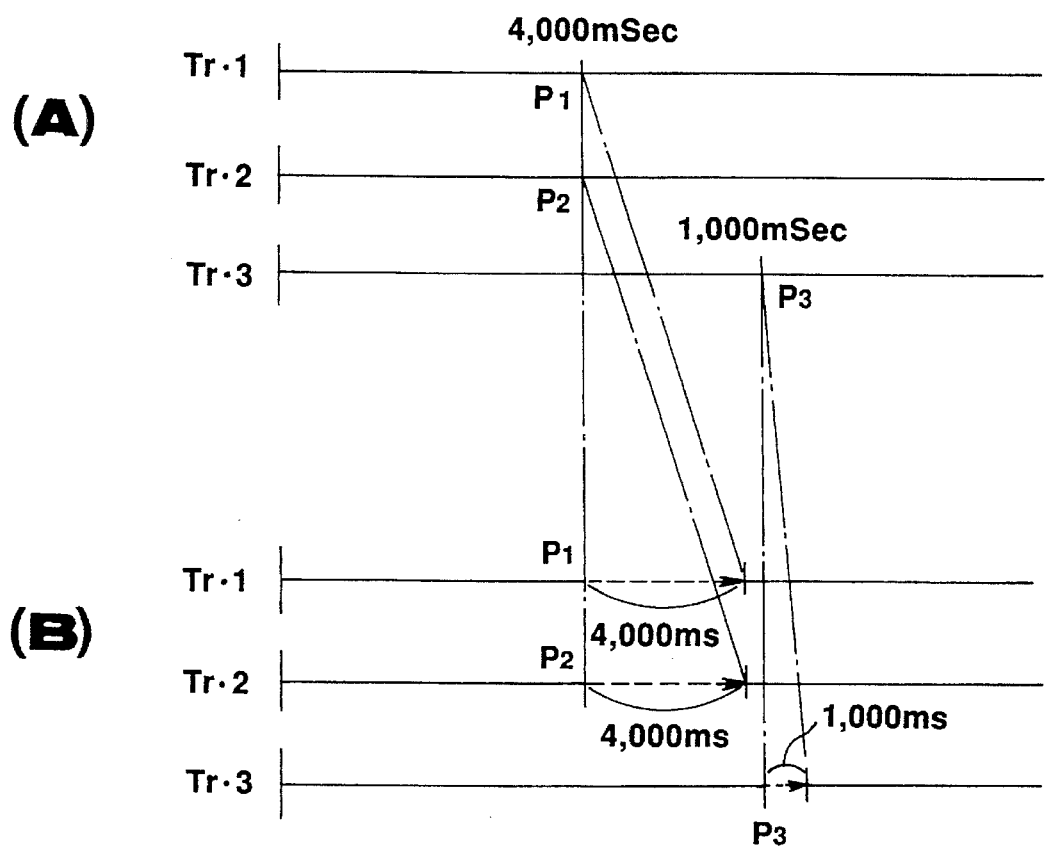
FIG. 17 is a timing chart for explaining the break processing.

As shown in FIG. 17, for example, breaks of a length 4000 ms are inserted at a point P1 on the original track Tr1 and at P2 on the original track Tr2, and a break of a length 1000 ms is inserted at a point P3 on the original track Tr3. When these tracks are reproduced, the breaks of a length 4000 ms are reproduced at a point P1 on the track Tr1 and at P2 on Tr2 respectively, and thereafter data following the points P1 and P2 on the original tracks are reproduced. On the track Tr3, the break of a length 1000 ms is reproduced at the point P3 and then the data on the original track will be reproduced following the reproduced break.

In case that a precise break length is decided, a method of FIG. 14 is conveniently used and allows to insert breaks easily, because this method is arranged for setting a break in terms of time.

Figure 15:
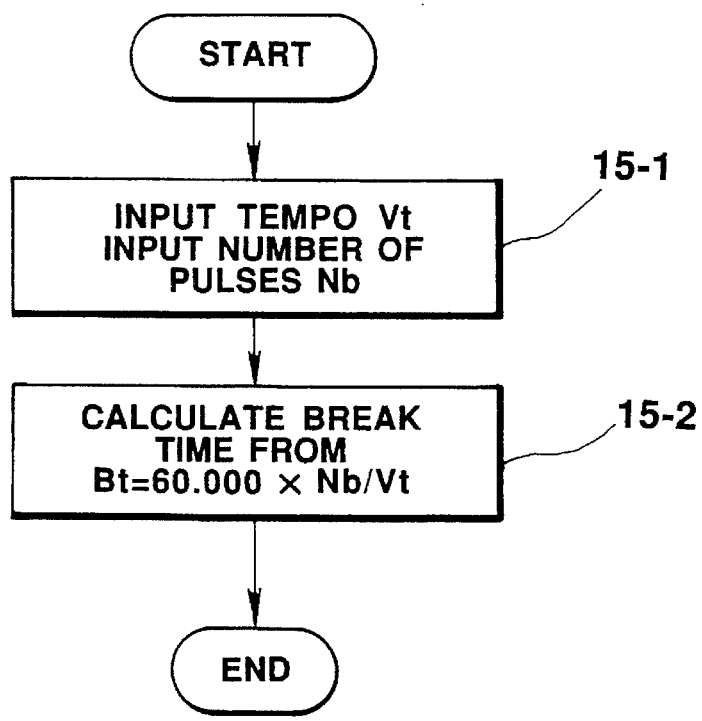
FIG. 15 is a flowchart illustrating another example of the break processing of the CPU 1 and its operation for preparing the break address table.

The flowchart of FIG. 15 illustrates processing for setting breaks in terms of a tempo and pulse. In this processing, a tempo Vt and a number Nb of pulses are input at step 15-1 and a break time Bt is calculated from the following equation:

$$Bt = 60,000 \times Nb/Vt$$

Since the tempo represents a number per one minute (60 seconds), the number of pulses may be expressed in terms of time in ms.

In case that the audio signal is music, the tempo of which is previously known, such a method for setting breaks in terms of tempo and a number of pulses is conveniently used, because breaks may be inserted intuitionally in accordance with the expression of music.

FIG. 16 is a flowchart of the processing for setting breaks in terms of tapping. At step 16-1, reproduction of the audio signal starts. At a predetermined timing (at a position where the editor wants to insert a break), the first tapping is inserted at step 16-2. The tapping may be inserted by operation of a predetermined key of the key board 4.

When the first tapping has been inserted at step 16-2, the CPU 1 starts a time counting operation at step 16-3, and waits at step 16-4 for the second tapping to be inserted. When the second tapping is inserted, the CPU 1 advances to step 16-5, where it stops the time counting operation to measure a time interval between the first and second tapping. Then, the CPU 1 registers the measured time interval as a break time length.

The method for setting a break time in terms of tapping allows the editor to set listening to a musical piece a predetermined time length in accordance with the musical piece, even though the tempo of the tune is unknown or the tempo is changed in the middle of the musical piece. Therefore, the editor can set a break time with a beat timing of the musical piece without paying attention to the absolute time. This method also allows the editor to intuitionally input tapping because there is no need at all for the editor to effect calculation of time.

As described above, a break of a given time length may be inserted at an arbitrary point to form a new TAKE, but since the original track is not modified at all, the audio signal with no break inserted may be reproduced when a command is issued to reproduce the original track.

The other structures and operation of the second embodiment are almost similar to those explained in the first embodiment, and no further detailed description thereof will be necessary.

Although the several embodiments of the present invention have been described, these embodiments are simply illustrative and not restrictive. The present invention may therefore be modified in various manners. All the modifications and applications of the present invention are within the scope and spirit of the invention, so that the scope of the invention should be determined only by what is recited in the appended claims and their equivalents.

What is claimed is:

1. A digital recorder comprising:

a memory for storing audio data in a plurality of tracks;

a temporary storing device for temporarily storing audio data reproduced from said memory;

instructing means, which is manually operable by an operator for setting operation modes of respective tracks, and for issuing a command, based on the set operation modes, to insert soundless portion data of a desired length into the audio data reproduced from said memory at a desirable point where original audio data does not include soundless portion data;

control means for writing soundless portion data which represents a substantially silent state, having a desired time duration, into said temporary storing device at said desirable point in place of the audio data reproduced from said memory, and thereafter writing the audio data reproduced from said memory, when said instructing means issues a command to insert the soundless portion data into the audio data; and audio output means for sequentially reading out contents stored in said temporary storing device at a predetermined sampling rate and for outputting sounds.

2. A digital recorder according to claim 1, wherein said instructing means issues a command to insert said soundless portion data of a desired length, said length being defined in terms of any one of a time duration, tempo and number of beats, and tapping.

3. A digital recorder comprising:

audio input/output means for executing input/output operation of an audio signal in association with a plurality of tracks;

buffer means capable of exchanging audio data track by track with said audio input/output means and temporarily storing the audio data in association with the respective tracks;

external memory means of a random access type, for exchanging the audio data with said buffer means, and having a memory area which stores the audio data for a plurality of tracks and is accessible for a read/write operation of the audio data;

data transfer means for executing (i) data transfer of the audio data track by track between said audio input/output means and said buffer means and (ii) data transfer of the audio data track by track between said buffer means and said external memory means, in a time sharing manner while scheduling in accordance with a predetermined order of priority;

instructing means, which is manually operable by an operator, for setting operation modes of respective tracks, and for issuing a command based on the set operation modes, to insert soundless portion data which represents a substantially silent state, at desired position in the audio data stored in said external memory means where original audio data does not include soundless portion data;

table memory means for storing an address table which stores:
(i) insertion position data representing an insertion position in the audio data where the soundless portion data is inserted, and
(ii) length data representing a length of silence, when said instructing means issues a command to insert the soundless portion data into the audio data;
soundless sound data generating means for controlling said data transfer means, when sounds are reproduced in accordance with contents stored in said table memory means, and for generating soundless portion data which represents a substantially silent state, so as to generate no sound for a period equivalent to the length data stored in said address table and for writing the generated soundless portion data into said buffer means, when a soundless portion is inserted at the insertion position, thereby changing the audio data stored in said buffer means.

4. A digital recorder according to claim 3, wherein said external random access memory comprises a disk memory medium.

5. A digital recorder according to claim 3, wherein said data transfer means executes data transfer of the audio data for respective tracks between said audio input/output means and said buffer at a rate corresponding to a sampling cycle.

6. A digital recorder according to claim 3, wherein said audio input/output means includes request means for requesting said data transfer means at a rate corresponding to a sampling frequency of the audio data in digital form to execute data transfer of the digital audio data with said buffer, and said data transfer means executes a single transfer of the digital audio data obtained in one sampling process in response to the request from said request means.

7. A digital recorder according to claim 3, wherein said external memory means includes request means for sequentially requesting said data transfer means to execute data transfer of the audio data in digital form with said buffer with respect to the tracks in operation, and said request means executes block transfer of the digital audio data obtained in a plurality of sampling processes with said buffer.

8. A digital recorder comprising:

audio memory means for storing audio data in a plurality of tracks;

instructing means, which is manually operable by an operator for setting operation modes of respective tracks, and for issuing a command, based on the set operation modes, to insert soundless portion data into the audio data stored in said audio memory means at a desirable point where original audio data does not include soundless portion data; and soundless portion data generating means for generating soundless portion data which represents a substantially silent state, so as to generate no sound for a desired time duration immediately after previously reproduced audio data in place of the audio data to be reproduced from said audio memory means, when said instructing means issues a command to insert the soundless portion data into the audio data, thereby changing the reproduction of the audio data stored in said audio memory means.

9. A digital recorder according to claim 8, wherein said instructing means issues a command to insert said soundless portion data of a desired length, said length being defined in terms of any one of a time duration, tempo and number of beats, and tapping.

* * * * *